United States Patent
Peled et al.

(10) Patent No.: US 6,724,391 B1
(45) Date of Patent: Apr. 20, 2004

(54) MECHANISM FOR IMPLEMENTING Z-COMPRESSION TRANSPARENTLY

(75) Inventors: Guy Peled, Yokne'am (IL); Zeev Sperber, Zichron Yaakov (IL); Doron Orenstein, Haifa (IL); Guiiermo Savranski, Haifa (IL)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 09/608,619

(22) Filed: Jun. 30, 2000

(51) Int. Cl.$^7$ .................................................. G06T 9/00
(52) U.S. Cl. ........................ 345/555; 345/422; 345/556; 709/108
(58) Field of Search ................................ 345/555, 422, 345/530, 561–563, 501, 421, 522, 556; 382/232, 234; 710/264, 260; 712/228; 709/107, 108, 103, 100, 102

(56) References Cited

U.S. PATENT DOCUMENTS

| | | | |
|---|---|---|---|
| 4,612,612 A | | 9/1986 | Woffinden et al. |
| 4,654,790 A | | 3/1987 | Woffinden |
| 4,910,656 A | | 3/1990 | Scales, III et al. |
| 5,371,849 A | * | 12/1994 | Peaslee et al. ............. 345/558 |
| 5,428,761 A | | 6/1995 | Herlihy et al. |
| 5,696,927 A | | 12/1997 | MacDonald et al. |
| 5,729,669 A | * | 3/1998 | Appleton .................... 345/422 |
| 5,808,618 A | * | 9/1998 | Kawano et al. ............ 345/422 |
| 5,812,150 A | * | 9/1998 | Lum .......................... 345/501 |
| 5,819,017 A | * | 10/1998 | Akeley et al. .............. 345/421 |
| 5,864,859 A | | 1/1999 | Franaszek |
| 5,870,095 A | | 2/1999 | Albaugh et al. |
| 5,875,454 A | | 2/1999 | Craft et al. |
| 6,014,728 A | | 1/2000 | Baror |
| 6,104,837 A | * | 8/2000 | Walker ....................... 345/421 |
| 6,188,394 B1 | * | 2/2001 | Morein et al. .............. 345/555 |
| 6,240,419 B1 | | 5/2001 | Franaszek |
| 6,253,287 B1 | | 6/2001 | Green |
| 6,348,919 B1 | | 2/2002 | Murphy |
| 6,373,482 B1 | | 4/2002 | Migdel et al. |
| 6,407,741 B1 | * | 6/2002 | Morein et al. .............. 345/555 |

FOREIGN PATENT DOCUMENTS

EP 1 074 945 A2 2/2001
WO PCT/US01/20114 6/2001

OTHER PUBLICATIONS

Tom's Hardware Guide: Graphics Guide—Ati Radeon256 Preview, *"Have a home project"*, (http://www7.tomshardware.com/graphic/00q2/000425/radeon256–06.html) (May 17, 2000) pp. 1–3.

Tom's Hardware Guide: Graphics Guide—Ati Radeon256 Preview, *"Have someone else do your home project"*, (http://www7.tomshardware.com/graphic/00q2/000425/radeon256–01.html) (May 17, 2000) pp. 1–3.

Tom's Hardware Guide: Graphics Guide—Ati Radeon256 Preview, *"Have someone else do your home project"*, (http://www7.tomshardware.com/graphic/00q2/000425/index.html) (May 17, 2000) pp. 1–3.

* cited by examiner

*Primary Examiner*—Kee M. Tung
(74) *Attorney, Agent, or Firm*—Blakely, Sokoloff, Taylor & Zafman LLP

(57) ABSTRACT

The present invention provides a mechanism for implementing z-compression in a manner that is transparent to the user. Blocks of z-data are associated with storage locations in a z-data buffer in cleared, compressed, or uncompressed data states. Operations to the z-data buffer are monitored for selected operations. These operations may include clear or lock operations. If a selected operation is detected, a modified version of the selected operation is implemented to mask differences between the storage states of the data blocks.

18 Claims, 17 Drawing Sheets

| | | | | |
|---|---|---|---|---|
| QW0 | $Z_{0,0}$ | $Z_{0,1}$ | $Z_{0,2}$ | $Z_{0,3}$ |
| QW1 | $Z_{1,0}$ | $Z_{1,1}$ | $Z_{1,2}$ | $Z_{1,3}$ |
| QW2 | $Z_{2,0}$ | $Z_{2,1}$ | $Z_{2,2}$ | $Z_{2,3}$ |
| QW3 | $Z_{3,0}$ | $Z_{3,1}$ | $Z_{3,2}$ | $Z_{3,3}$ |

810

UNCOMPRESSED SPAN
BLOCK (16-BIT)

Fig. 8A

| | | | | |
|---|---|---|---|---|
| DQW0 | $Z_{0,0}$ | $Z_{0,1}$ | $Z_{0,2}$ | $Z_{0,3}$ |
| DQW1 | $Z_{1,0}$ | $Z_{1,1}$ | $Z_{1,2}$ | $Z_{1,3}$ |
| DQW2 | $Z_{2,0}$ | $Z_{2,1}$ | $Z_{2,2}$ | $Z_{2,3}$ |
| DQW3 | $Z_{3,0}$ | $Z_{3,1}$ | $Z_{3,2}$ | $Z_{3,3}$ |

850

UNCOMPRESSED SPAN
BLOCK (32-BIT)

Fig. 8B

| | | | | |
|---|---|---|---|---|
| DQW | STNCL | $C_Y$ | $C_X$ | $c_0 - C_y + Z_{bias}$ |

900

COMPRESSED SPAN

Fig. 9

MECHANISM FOR IMPLEMENTING Z-COMPRESSION TRANSPARENTLY

RELATED PATENT APPLICATIONS

This patent application is related to the U.S. Patent issued to Orenstien et al. (U.S. Pat. No. 6,580,427), entitled, Z-Compression Mechanism, assigned to the same assignee herein, and filed on Jun. 30, 2000. This patent application is also related to the U.S. Patent issued to Orenstien et al. (U.S. Pat. No. 6,557,083), entitled, Memory System for Multiple Data Types, assigned to the same assignee herein, and filed on Jun. 30, 2000.

BACKGROUND OF THE INVENTION

1. Technical Field

The present invention relates to graphics systems and, in particular, to mechanisms for processing depth or z-data for 3 dimensional (3D) graphics in a manner that is transparent to the user.

2. Background Art

Available computer systems typically include dedicated graphics resources to support the graphics-intensive applications that are prevalent today. Graphics applications, particularly those providing 3D effects, require rapid access to large amounts of graphics data.

A standard method for generating a 3D image begins with sets of primitives that represent the surfaces of each object in the image. Primitives are typically polygons such as triangles or rectangles that may be tiled to form a surface. An object that has a moderately complex shape may require thousands of primitives to represent its surface, and an image that includes multiple objects may require tens or even hundreds of thousands of primitives. Depth, color, texture, illumination and orientation data for each of these primitives must be processed and converted to pixel level data to generate a 3D image on a display device.

Image processing is often implemented through a 3D pipeline that includes a geometry or set-up phase and a rendering or scan-conversion phase. In the geometry phase, the orientation of each primitive and the location of any light sources that illuminate the primitive are determined with respect to a reference coordinate system and specified by vectors associated with the primitive's vertices. This vertex data is then transformed to a viewing or camera coordinate system and rotated to a desired orientation.

In the scan conversion phase, the graphics primitives for each object in an image are converted into a single set of pixel values that provide a 2D representation of the 3D image. The pixels that make up the 2D image are typically stored in the entries of a frame buffer from which the display is generated. A well-known mechanism for populating the frame buffer generates color values for each location of a primitive by interpolating the transformed vertex data for the primitive. Since primitive locations are specified in 3D space, multiple primitive locations may map to the same frame buffer entry (pixel) of the 2D display surface. The generated color value for a primitive location is stored in the frame buffer entry to which it maps or discarded, according to whether or not it is visible in the final image. During this phase, texture data may also be determined for the primitives.

One technique for determining which locations of each primitive are visible in the final image employs a z-buffer. The z-buffer includes an entry for each pixel in the frame buffer. Each z-buffer entry is initialized to zero or other reference value. Often, the reference value represents a back clipping plane of the image. During scan conversion, a z-value is determined for each location within the primitive and compared with the entry in the z-buffer to which the primitive location maps. If the value in the z-buffer is closer to the viewer than the z-value determined for the corresponding primitive location, the primitive location is not visible in the final image, and its color value is discarded. If the value in the z-buffer is further from the viewer than the z-value determined for the corresponding primitive location, the color value for the location is stored in the appropriate entry of the frame buffer. If the color value is not replaced before scan conversion completes, it is displayed in the final image.

Significant amounts of texture, color and z-data are transferred between memory and the graphics resources during the rendering stage. Since there may be tens to hundreds of pixels per primitive, these data transfers can place significant burdens on the bandwidth of the memory channel. The consequent reduction in memory bandwidth can reduce the performance of the graphics system. This is particularly true if the graphic system is implemented in a computer system that employs a unified memory architecture (UMA). For UMA-based computer systems, the central processor unit(s) (CPU) and graphics engine have equal access to main memory. Memory demands by the graphics engine can reduce CPU performance. In addition, memory demands by one unit of the graphics engine can reduce the performance of other units. For example, any bandwidth used to transfer z-data for z-testing is unavailable to the unit that determines pixel textures, and the loss in bandwidth can reduce its performance.

The present invention addresses these and other issues associated with memory bandwidth in graphics systems.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

FIGS. 8A and 8B represent embodiments of 16-bit and 32-bit z-data formats that may be compressed using a mechanism in accordance with the present invention.

FIG. 9 represents one embodiment of compressed format for z-data that may be used by a system implementing the present invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Figure 1:
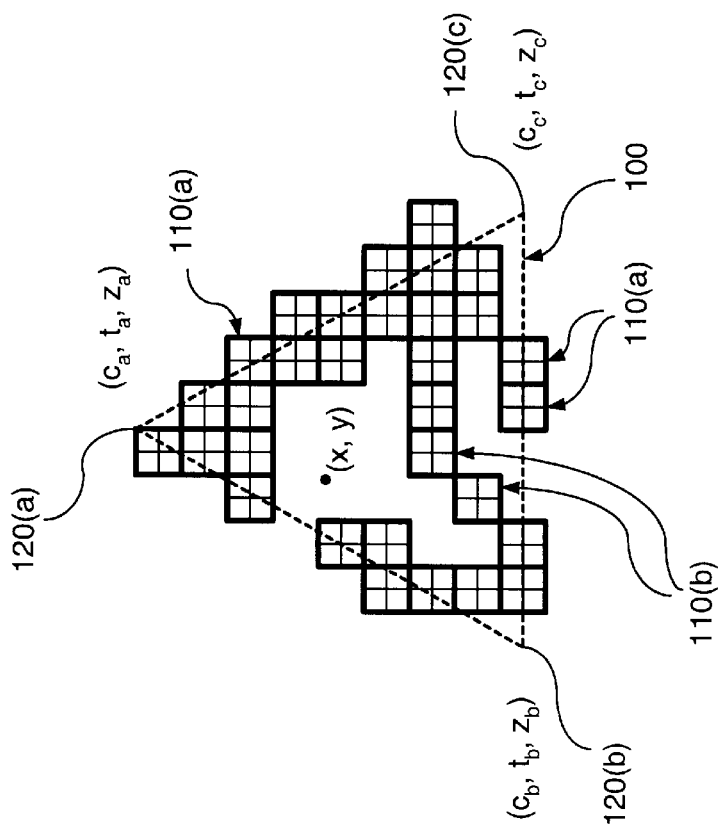
FIG. 1 is a diagram representing one mapping between the locations of a primitive and blocks of pixel-level data.

FIG. 1 is a schematic representation of a graphics primitive 100 and a subset of data blocks 110(a), 110(b) (generically, "data blocks 110") to which corresponding locations (x, y) in primitive 100 are mapped in a viewing coordinate system. Multiple graphics primitives 100 are used to approximate the surface of an object that is to be represented in an image. While graphics primitive 100 is shown as a triangle, it is well know that any type of polygon may be used to represent the surface of an object. Similarly, embodiments of the present invention are illustrated with reference to data blocks 110 comprising 4×4 arrays of pixels (spans), but other data block configurations may also be used.

Colors, texture coordinates, and depths (c, t, z) are associated with vertices 120(a), 120(b), 120(c) of primitive 100. Other attributes, such as fog and alpha (not shown) may also be assigned to vertices. These vertex properties are then interpolated to provide values for all primitive locations (x, y), which may be mapped to the pixels of data blocks 110. For the disclosed representation, data blocks 110(b) are spans for which all component pixels are mapped from locations within primitive 100. Data blocks 110(a) are spans for which pixel values are mapped from locations that straddle one or more boundaries of primitive 100. That is, not all pixels of data blocks 110(a) correspond to locations within primitive 100.

Figure 2:
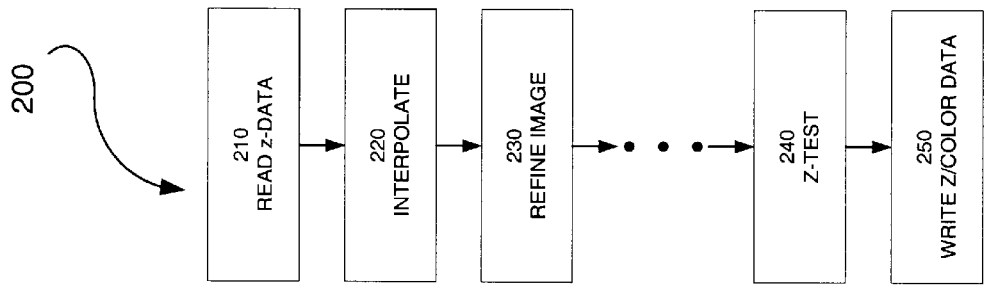
FIG. 2 is a schematic representation of a graphics pipeline suitable for scan converting primitive data into pixel data.

FIG. 2 represents one embodiment of a graphics processing pipeline 200 to implement can conversion. Z-data is read 210 from the entries of a z-buffer to which a given primitive maps. Vertex data for the primitive is interpolated 220 to generate, e.g. color, texture, and z data for each primitive location. For example, z-data for each location (x, y) of a primitive may be generated from the primitive's vertex data, using a surface function of the form $z = C_0 + C_x \cdot x + C_y \cdot y$, as discussed below. Color values and texture coordinates may be generated for each location during this stage as well.

In subsequent stages of pipeline 200, image-refining techniques, such as texture mapping, bump mapping, alpha-blending and the like, may be executed 230. A z-test 240 determines which locations of the primitive, if any, contribute their color values to the frame buffer, i.e. which portions of the primitive will be visible in the 2D image. If the z-value determined for a location passes the z-test, the appropriate entries in the frame and z-buffers are updated with the color and z-values, respectively, of the primitive location. Otherwise, the values are discarded.

The transfer of graphics-data between the graphics engine and memory locations in the frame and z-buffers, reduces the available memory bandwidth. For memory architectures like UMA, this reduction can have a detrimental effect on a computer system's overall performance. Various methods have been proposed for reducing the bandwidth impact of texture data transfers. The present invention provides a mechanism for reducing the impact of depth-buffering and its associated data transfers on system performance.

Figure 3:
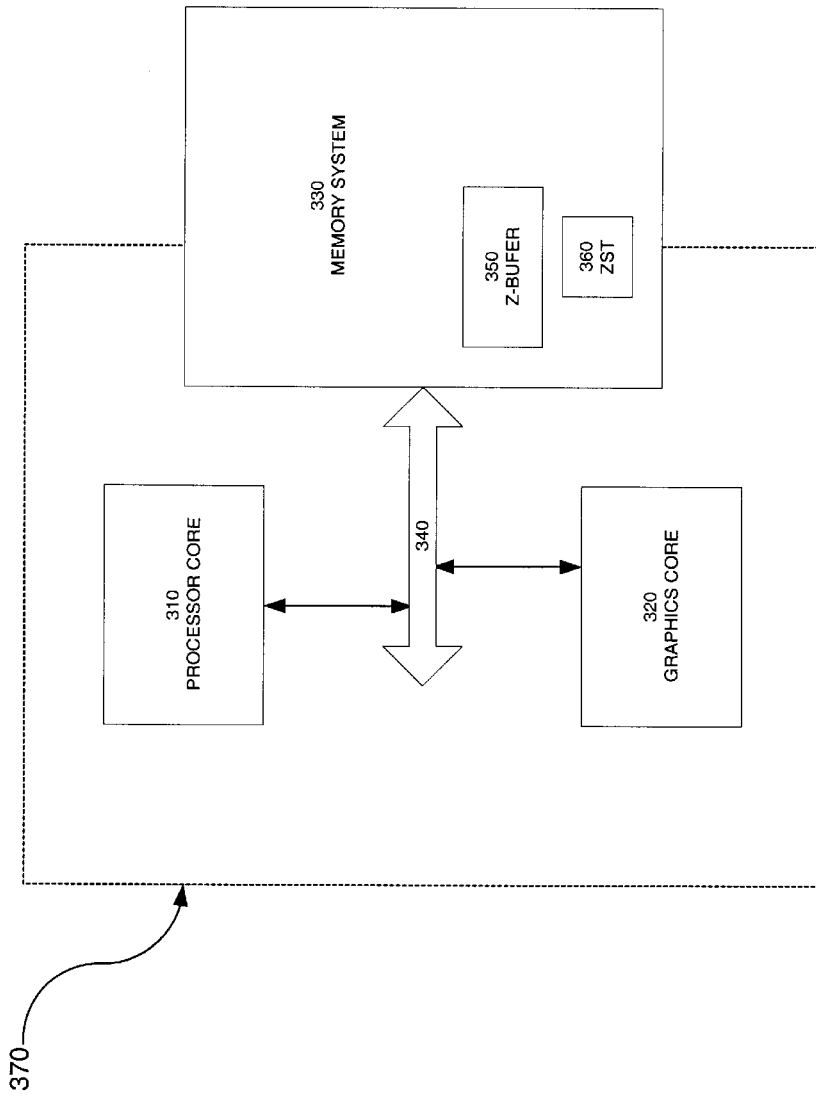
FIG. 3 is a block diagram of one embodiment of a computer system that implements a z-compression mechanism in accordance with the present invention.

FIG. 3 is a block level diagram of one embodiment of a computer system 300 that implements z-compression in accordance with the present invention. Computer system 300 includes a processor core 310, a graphics core 320 and a memory system 330. Processor core 310 and graphics core 320 are coupled to a bus or memory channel 340 to transfer data to and from memory system 330. The dashed line indicates a boundary of an integrated circuit die 370 for an embodiment of computer system 300 in which processor core 310 and graphics core 320 are integrated on a single chip. This embodiment of computer system 300 is likely to implement a unified memory architecture (UMA), for which the features of the present invention may provide significant advantages. The present invention is not, however, limited to computer systems that employ integrated graphics and processor cores or UMA.

Figure 4:
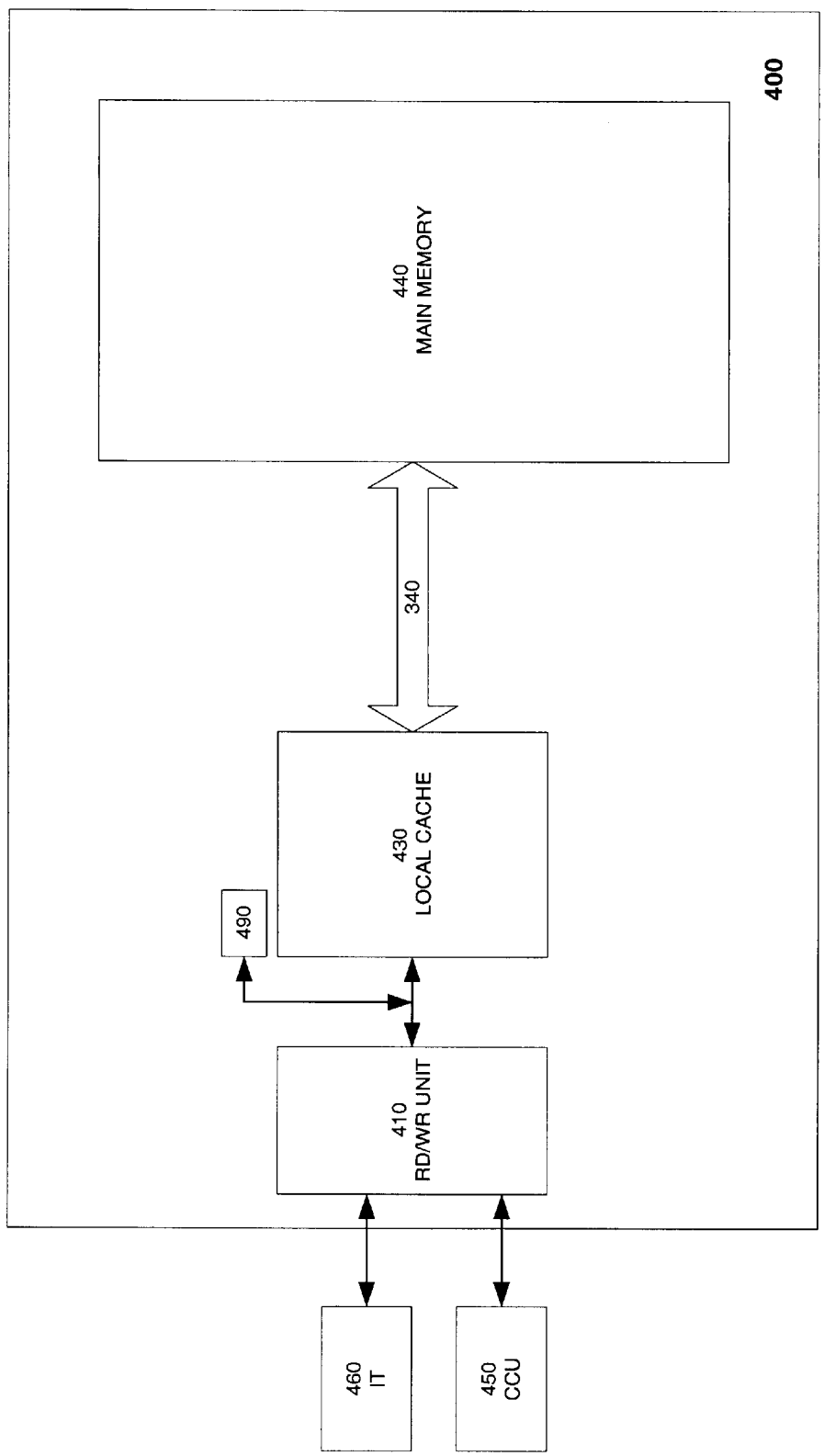
FIG. 4 is a block diagram of one embodiment of a z-compression system in which blocks of z-data and their associated status data are distributed between a local cache and a main memory.

For the disclosed embodiment of computer system 300, memory system 330 is shown straddling a boundary of die 370 to indicate that it may include on-chip and off-chip components. For example, memory system 330 typically includes one or more caches located on circuit die 370 and a main memory that is located on a separate circuit die. Memory system 330 further comprises a z-buffer 350 and a z-status table (ZST) 360, portions of which may be distributed between on and off-chip memory structures (FIG. 4). As discussed below in greater detail, ZST 360 provides status information for associated entries in z-buffer 350. This status information may be used to reduce or eliminate data transfers on memory channel 340.

One embodiment of ZST 360 includes entries to track a current status for each block of z-data stored in z-buffer 350. The status indicates how the corresponding z-data block is stored and may be used to manage the transfer of data between graphics core 320 and memory 330. The status may indicate, for example, whether z-data for a particular span is in a compressed format or an uncompressed format, or whether it has a reference value that may be provided from a local storage location, such as a register. Compressed z-data may be transferred with significantly lower impact on the bandwidth of memory channel 340 than uncompressed data. Further, z-data that is available in, e.g., a local register, need not consume any memory bandwidth at all. One or more components of graphics core 320 use ZST 350 to manage z-data transfers more efficiently and with lower impact on the bandwidth of the memory channel.

For one embodiment of ZST 360, each entry stores a 2-bit status code to indicate a data status for a corresponding data block. Table 1 summarizes one set of 4-bit status codes that may be used.

TABLE 1

| Code | Status | Access |
|------|--------|--------|
| 00 | Cleared | Z-value remains at initialized value. Retrieve from local register |
| 01 | Uncompressed | Z-value stored in uncompressed format. |
| 10 | Compressed | Z-value stored in compressed format. Decompress retrieved value |
| 11 | Reserved | NA |

For example, each image may be initialized with all entries of z-buffer 350 in a cleared state (00). The status values in ZST 360 may be adjusted as the initialized values in the z-buffer are updated during scan conversion. Depending on the status code, a z-buffer access may be executed normally, a compressed z-buffer access may be implemented or the z-buffer access may be avoided altogether. The last two options reduce the impact of z-data accesses on memory channel bandwidth.

In the following discussion, a block of z-data in which each z-value represents a constant reference depth is referred to as "cleared". This depth may correspond to a back clipping plane in the image space. Since this value is a constant, it may be stored in a register that is local to graphics core 320. When an access targets a span having a cleared data status (00), the cleared value can be read from the local register, eliminating the z-buffer access and preserving memory channel bandwidth. If an access targets a data block that is designated as compressed (10), the targeted z-data may be retrieved in a compressed format and decompressed for use. As discussed below, compression reduces the size of the data block transferred for, e.g., z-testing, which saves memory channel bandwidth. If an access targets a data block that is designated as uncompressed (01), the access transfers an uncompressed block of z-data and no decompression is implemented.

Z-compression need not apply uniformly to all data stored in z-buffer 350. For example, a determination to write data to z-buffer 350 in compressed or uncompressed format may be made, in part, by reference to the relationship between the data block to be written and the primitive locations that map to the data block. A data block 110(*b*) that represents locations within the boundaries of primitive 100 can usually be compressed. As discussed below, exceptions may arise if the z-value also includes a stencil field or if certain clipping or saturation conditions prevail. A data block 110(*a*) to which locations straddling a primitive boundary are mapped, is usually not compressed. Where compression is implemented through a surface function (Eq. I), the z-values for locations on different sides of the primitive's boundaries may be governed by different surface functions. This z-compression scheme can generate erroneous results if a location outside the primitive is compressed using a surface equation that is only suitable for locations within the primitive.

FIG. 4 represents one embodiment of a z-compression system 400 that may be used to implement the present invention. Compression system 400 includes a read/write unit 410, a local cache 430, a main memory 440, and a local register 490. Main memory 440 and local cache 430 represent, for example, off-chip and on-chip components, respectively, for one embodiment of memory system 330. Read/write unit 410 implements memory access requests that originate from various units of graphics core 320, according to the status information associated with the data block(s) targeted by the access. Local cache 430 includes local copies of the status and z-data blocks for processing memory accesses. Requests that cannot be satisfied from local cache 430 are satisfied from main memory 440.

For a memory read access, read/write unit 410 determines from the status of a targeted data block whether the data block is in a compressed, uncompressed, or cleared state, and retrieves the targeted data from local cache 430, main memory 440 or local register 490 through a transfer appropriate to the indicated status. For a memory write access, read/write unit 410 uses information on the targeted data to determine whether to store it in a compressed, uncompressed, or cleared state, and it updates an associated data status accordingly.

Also shown in FIG. 4 are a color calculation unit (CCU) 450 and an interpolation unit (ITU) 460 that may provide input to embodiments of z-compression system 400 to implement data accesses. For example, CCU 450 determines color values from vertex data, and indicates to read/write unit 410 whether a data block may be compressed. ITU 460 determines pixel level z-values from primitive vertex data and provides read/write unit 410 with parameters that may be used to compress/decompress data blocks.

Figure 5A:
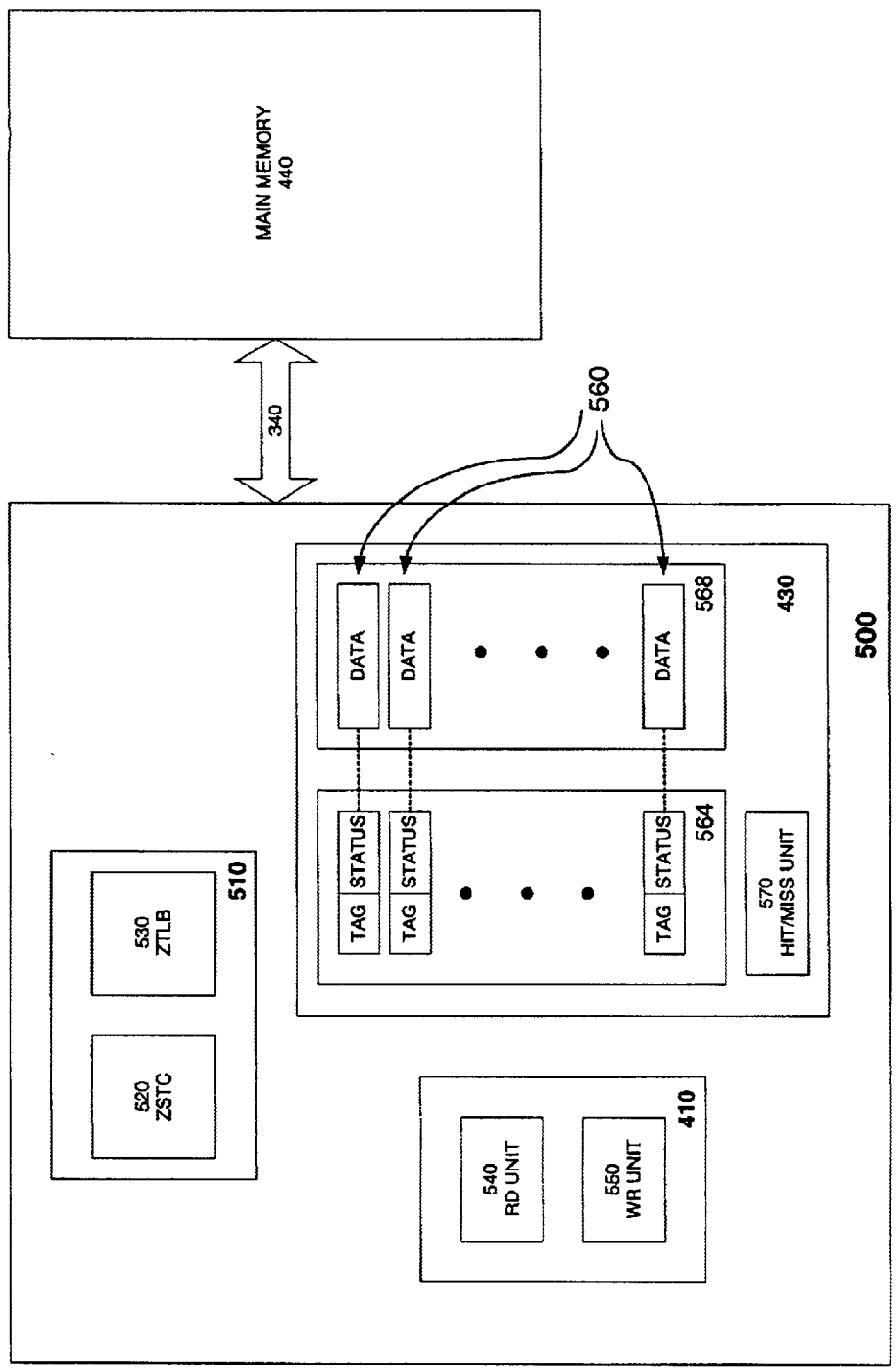
FIG. 5A is a block diagram of one embodiment of a local cache system to store both z-data values and associated status values.

FIG. 5A is a block diagram showing one embodiment of local cache system 500 that stores both z-data and data status information for cached data block entries. Storing both z-data and data status for data blocks in the same cache allows memory accesses, the form of which depends on data status information, to be processed more efficiently.

The disclosed embodiment of local cache system 500 includes read/write unit 410, local cache 430 and a translation unit 510. Translation unit 510 includes a z-status cache (ZSTC) 520 and a z-translation-lookaside buffer (ZTLB) 530. ZTLB 530 stores logical-to-physical memory address translations for z-data. ZSTC 520 stores status information for the z-data to which ZTLB 530 points. For one embodiment of cache system 500, each entry of ZTLB 530 stores a translation for a page of physical memory allocated to the z-buffer and ZSTC 520 stores the status data for the z-entries stored on the page. As discussed below in greater detail, status information from ZSTC 520 is used to control the size of z-data reads and writes to main memory 440.

The disclosed embodiment of local cache 430 includes a tag array 564, a data array 568 and hit/miss unit 570. Each entry 560 includes a tag field (TAG) a status field (STATUS) stored in tag array 564, and a data field (DATA) stored in data array 568. TAG stores a logical address (or portion thereof) which may be used to implement look-ups to local cache 430. STATUS stores status bits for the data block that is indexed by TAG, and DATA stores the block of z-data values. The disclosed embodiment of read/write unit 410 includes a read unit 540 and a write unit 550. Main memory 440 and memory channel 340 are also shown in FIG. 5.

For one embodiment of system 500, a look-up of local cache 430 is triggered in response to a memory access. For example, hit/miss unit 570 compares a logical address (or portion thereof) specified by a read access with the tag fields of entries 560. If the access hits, the value in STATUS is provided to read unit 540, which determines an appropriate data retrieval flow. For compressed data (STATUS=10) and uncompressed data (STATUS=01), read unit 540 retrieves the data from the hit entry, using an appropriately sized transfer. Compressed (CMP) data is decompressed and forwarded to the requestor, which may be CCU 450 for the disclosed embodiment of system 500. Uncompressed (UNC) data is forwarded to the requestor without decompression. For cleared data (STATUS=00), read unit 540 provides the cleared data to the requestor from local register 490.

For one embodiment local cache system hit/miss unit 570 considers STATUS & TAG to determine whether an access "hits" or "misses" in local cache 430. For example, an access targeting uncompressed data may hit wholly or partially in local cache 430 according to the following criteria:

| | |
|---|---|
| Hit | = Tag_Match & No_Blocking & [(UNC & QW_Match\|CMP\|CLEAR] |
| Partial_Hit | = Tag_Match & No_Blocking & (UNC & !QW_Match) |
| Miss | = !Tag_Match |

Here, Tag_Match indicates whether the tag identifying the address to be accessed matches a tag in the cache, No_Blocking indicates whether the another access stalls the current access, and QW_Match indicates which portion of a data is being sought in the cache line or data block identified by the tag. QW_Match may be used for embodiments of local cache 430 that allow the QWs of a data block to be accessed separately. A partial hit occurs when a line is allocated for the tag in the cache (Tag_Match) but the particular quadword sought is not available in the cache.

If hit/miss unit 570 determines a read access missed in local cache 430, a look-up is initiated to translation unit 510. For the disclosed embodiment of replacement unit 510, entries of ZTLB 530 include logical-to-physical address translations that are indexed by a logical address tag field, and ZSTC 520 stores status bits for each data block tracked in ZTLB 530. If the look-up hits in translation unit 510, the status bits indicate the state of the data block(s) at the indicated physical address in main memory 440. If STATUS=cleared, the z-values of the "cleared" data block are provided from local register 490, and no traffic is generated on memory channel 340. If STATUS=compressed or uncompressed, the data block is retrieved from main memory 440 by executing a partial fetch or a full fetch, respectively, to the indicated physical address. Depending on the z-data format, e.g. 32-bit or 16-bit, the partial fetch uses ½ to ¼ of the bandwidth used by the full fetch.

Figure 5B:
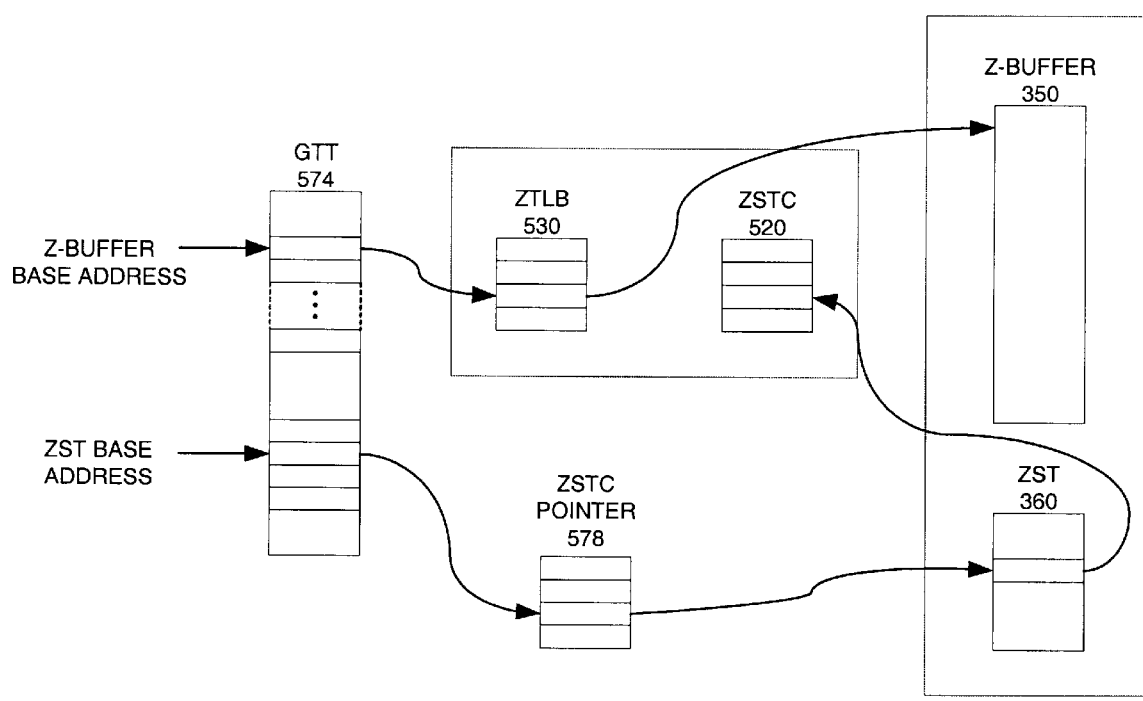
FIG. 5B is a block diagram representing a mechanism for updating the local cache system of FIG. 5A on a TLB miss.

FIG. 5B represents a mechanism for updating translation unit 510 in the event that the look-up does not hit in ZTLB 530 ("TLB-miss"). For the disclosed embodiment, a graphics translation table (GTT) 574 is used to translate the, e.g., 4 Kbyte pages of an Advanced Graphics Port (AGP) memory to physical addresses. GTT 574 includes entries for Z-buffer 350 and for ZST 360. A ZSTC Pointer Table (ZPT) 578 stores pointers to locations in ZST 360. That is, ZPT 578 operates like a TLB for ZST 360.

On an initial TLB-miss, GTT 574 provides the missed TLB translation to ZTLB 530. Pointers from GTT 574 are also read into ZPT 578, and the pointer associated with the missed TLB entry is used to retrieve the corresponding status data from ZST 360. The updated translation is used to retrieve the targeted data block in main memory 440 according to the updated status data. Data array 568 and tag array 564 are updated with the retrieved z-data and its status, respectively. In general, ZSTC 520 is updated whenever the status of a data block is changed. When an entry in ZTLB 530 is replaced, the corresponding entry in ZSTC 520 is written back to memory.

Figure 6A:
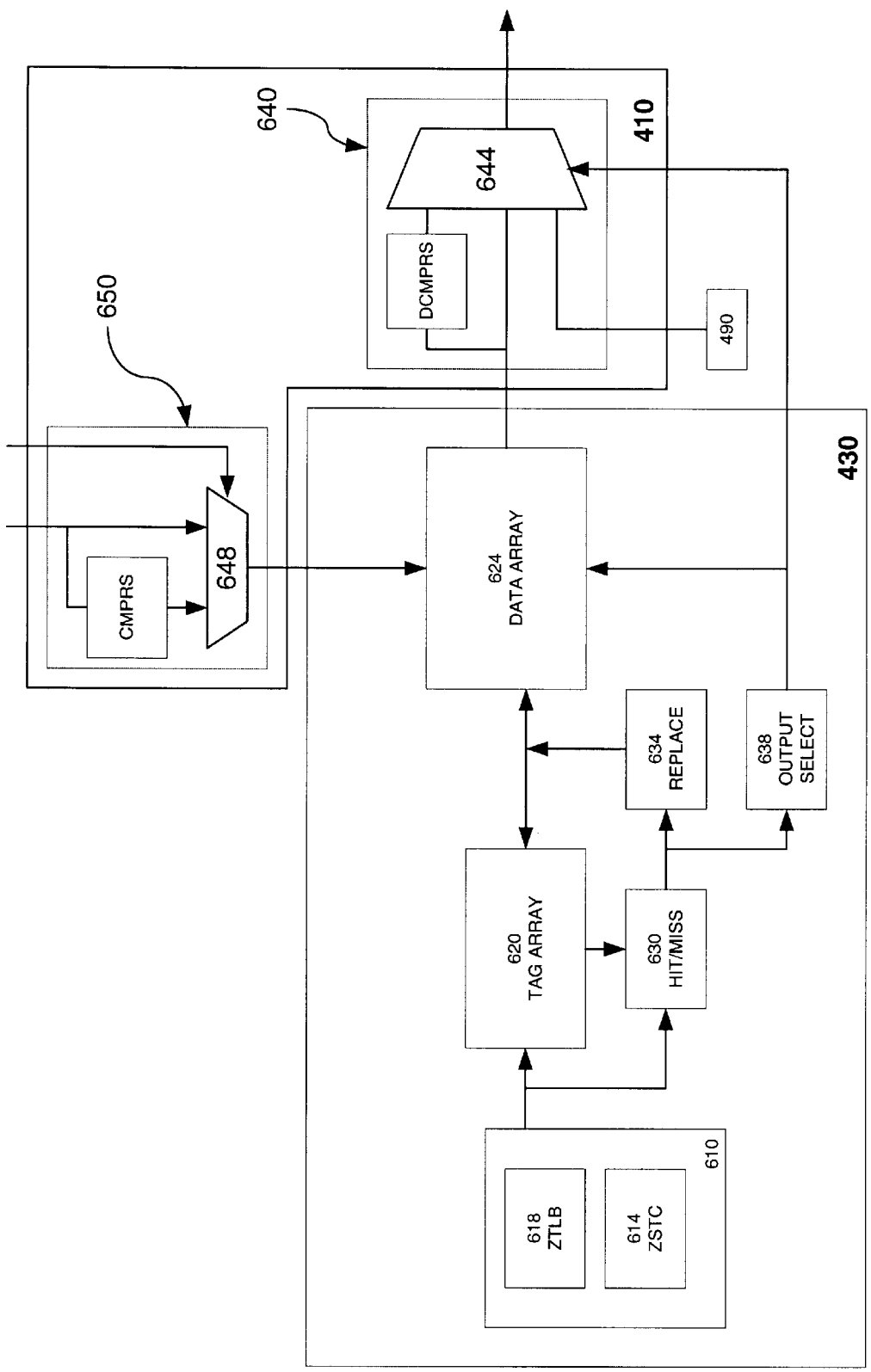
FIG. 6A is a schematic representation of another embodiment of a local cache system to store both z-data values and associated status values.

FIG. 6A is a block diagram of an embodiment of a local cache system 600 that includes a physically addressed local cache 430. The disclosed embodiment of local cache 430 includes translation unit 610, tag array 620, data array 624, hit/miss unit 630, replacement unit 634, and output selection unit 638. Read/write unit 410 moves data in and out of local cache 430 and register 490. CMPRS and DCMPRS compress and decompress data, respectively, for transfer to and from data array 624. Data array 624 stores data blocks that are indexed by physical addresses (or portions thereof), which are stored in tag array 620. The data block targeted by a memory access is specified through a logical address, such as the primitive or span coordinates (x, y) of the data block.

Translation unit 610 provides logical to physical address translations that allow local cache 430 to be searched for data targeted by a memory access. Translation unit 610 includes a ZSTC 614 and a ZTLB 618, which provide functions similar to those provided by ZSTC 520 and ZTLB 530. When an address hits in ZTLB 618, the hit entry provides the physical address to which the logical address is mapped and a corresponding entry of ZSTC 614 provides a status for the data. Embodiments of cache system 600 may update tag array with status data for the entry. Hit/miss unit 630 compares the physical address with the entries in tag array 620.

For accesses that miss in tag array 620, replacement unit 634 determines which of the current entries will be allocated to receive the data returned from a higher memory structure. For accesses that hit in tag array 620, output selection unit 638 indicates the hit entry to data array 624 and the status information from tag array 620 determines how the data is retrieved. For an embodiment that stores one span per cache line, if the targeted data is compressed, half a cache line is retrieved from data array 660, decompressed, and forwarded to the requestor. If the targeted data is uncompressed, a full cache line is retrieved from data array 660 and forwarded to the requestor without decompression. If the targeted data is cleared, the data is retrieved from local register 490 and forwarded to the requestor.

Read/write unit 410 includes a MUX 644 in read unit 640 to provide data responsive to its associated status. A MUX 648 in write unit 650 provides similar support for data being written to local cache 430. Status information is coupled to read/write unit 410 to indicate how the data being transferred should be handled.

Figure 6B:
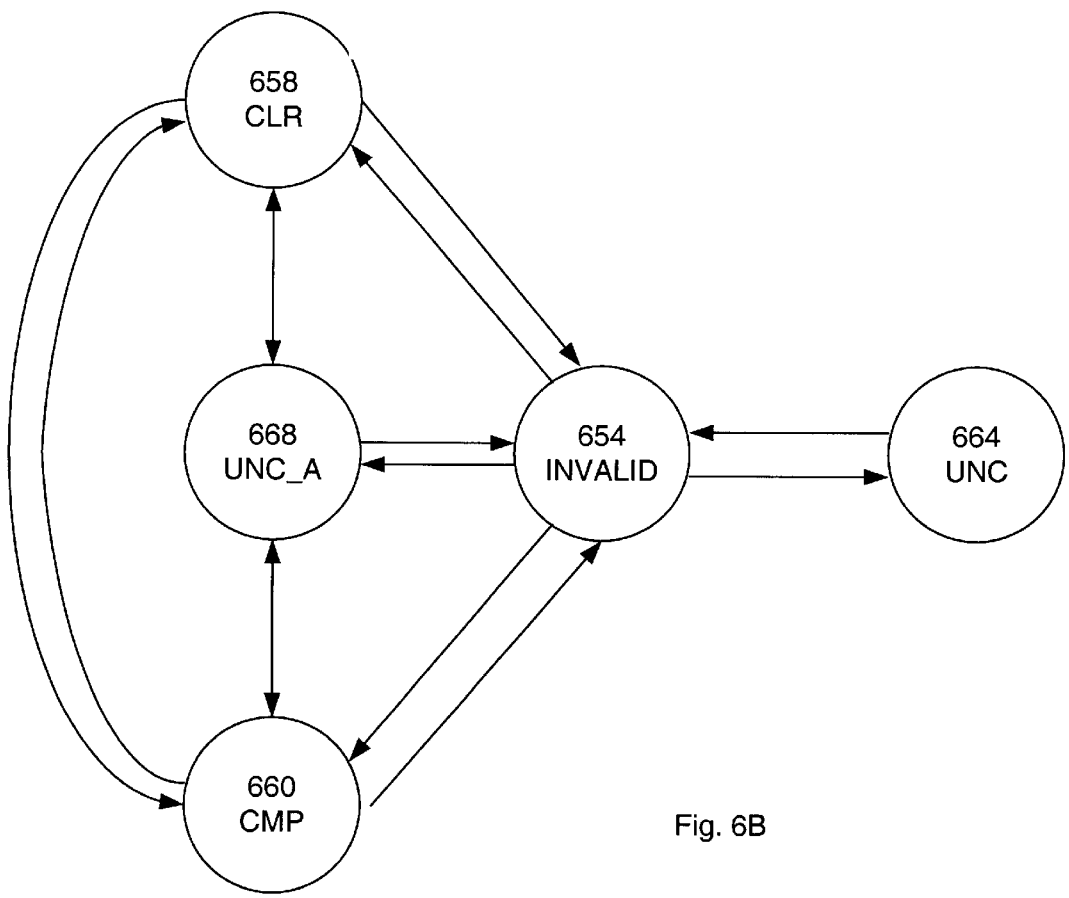
FIG. 6B is a state machine representing the state changes for the entries of the local cache of FIG. 6A.

FIG. 6B shows one embodiment of a state machine representing the state changes possible for an entry of data array 624. Before the entry is allocated, it is in an invalid state 654. When the entry is allocated to a data block, its status is updated to cleared (CLR 658), compressed (CMP 660), uncompressed (UNC 664) or uncompressed_all (UNC_A 668), according to the status of the data block to which it is allocated. For the disclosed embodiment, the status is indicated by a corresponding entry in ZSTC 614. For caches that allow less then a full line of data to be loaded, UNC and UNC_A distinguish between cache lines that are partially and fully populated, respectively, with data. Entries that store data blocks in CLR 658 or CMP 660 may transition to UNC_A 668 when if the previously cleared or compressed data blocks are written back to the cache in an uncompressed state. Since only full data blocks may be CLR 658 or CMP 660, no transition is provided between these states and UNC 664.

Figure 6C:
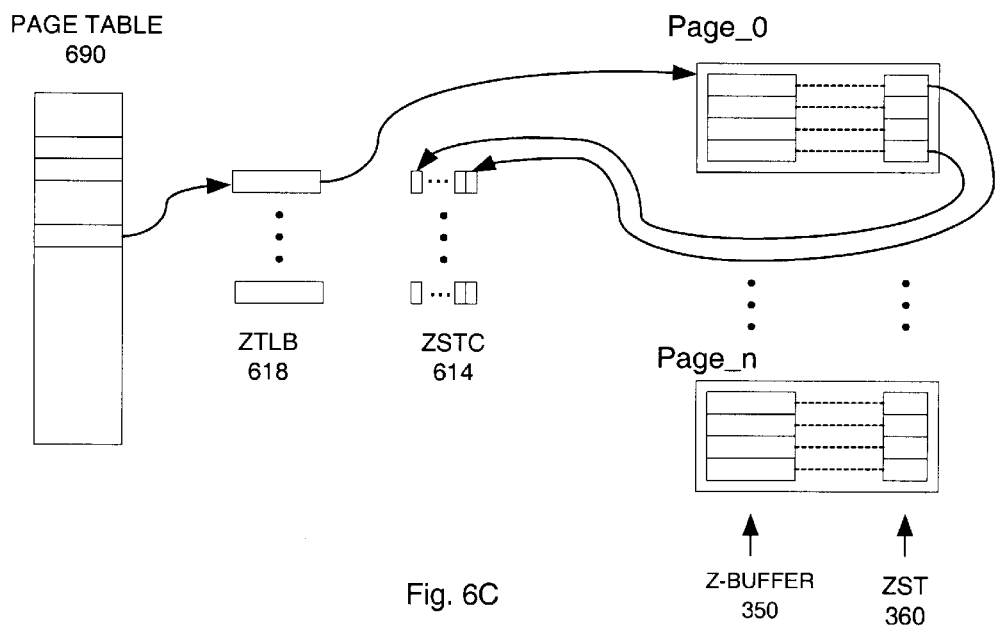
FIG. 6C is a schematic representation of a mechanism for updating the local cache system of FIG. 6A on a TLB miss.

If a data block that has been altered is evicted from local cache 430, the status of the evicted data block indicates the operations to be implemented. For example, if the data block in state CLR 658 is evicted, nothing is written back to a higher memory level, and the status of the entry from which the data block is evicted is updated to indicate the status of the new data block. If a data block in state CMP 660 is evicted, the portion of the cache line storing the compressed data, e.g. half the cache line, is written back to memory. If a data block in state UNC 664 is evicted, the altered bytes are written back to memory, and if a data block in state UNC_A is evicted the full cache line is written back to memory. In each case, the entry state is updated in the ZSTC to track the status of the evicted data block. When an entry is evicted from ZTLB 618, the corresponding bits of ZSTC 614 are written back to ZST 360. FIG. 6C represents a mechanism for updating translation unit 610 if a logical address misses in ZTLB 618. For the disclosed embodiment, a miss triggers a read to a page table 690, which provides a TLB entry indicated by the access. ZTLB 618 is updated with the new TLB entry and ZSTC 614 is updated with the status data for all data blocks on the page. The targeted cache line is loaded into data array 624 from the indicated address in Z-buffer 350, and the state in tag array 620 is updated to a reflect the (storage) state of the data block.

FIGS. 5A, 5B and 6A–6C illustrate various features of two embodiments of a cache system that is suitable for handling mixed status and data information. For both embodiments, the data arrays may store data in compressed and uncompressed formats (or not at all, in the case of cleared entries). Cache management logic moves the data in and out of the data array according to its associated status, and controls operations to an external memory according to the status. The TLBs provide access to both the z-data blocks and their associated status. Status is stored per data block in a tag array and per memory page in the translation unit (ZSTC). While these cache systems have been described as part of a z-compression mechanism, they may also be employed in other systems that need to track different types of data.

The various functional units of graphics core 320 operate on data in its UNC (or UNC_A) format. Accordingly, a data block may be written back to local cache 430 or memory 440 in a compressed (or recompressed) or an uncompressed state, or the write may be avoided altogether if the data status is cleared. For one embodiment of local cache system 500, write unit 550 handles the write access according to a status determined for the data block targeted by the write. Different criteria for whether or not a data block may be compressed or represented by a cleared value are discussed below in greater detail.

Figure 7:
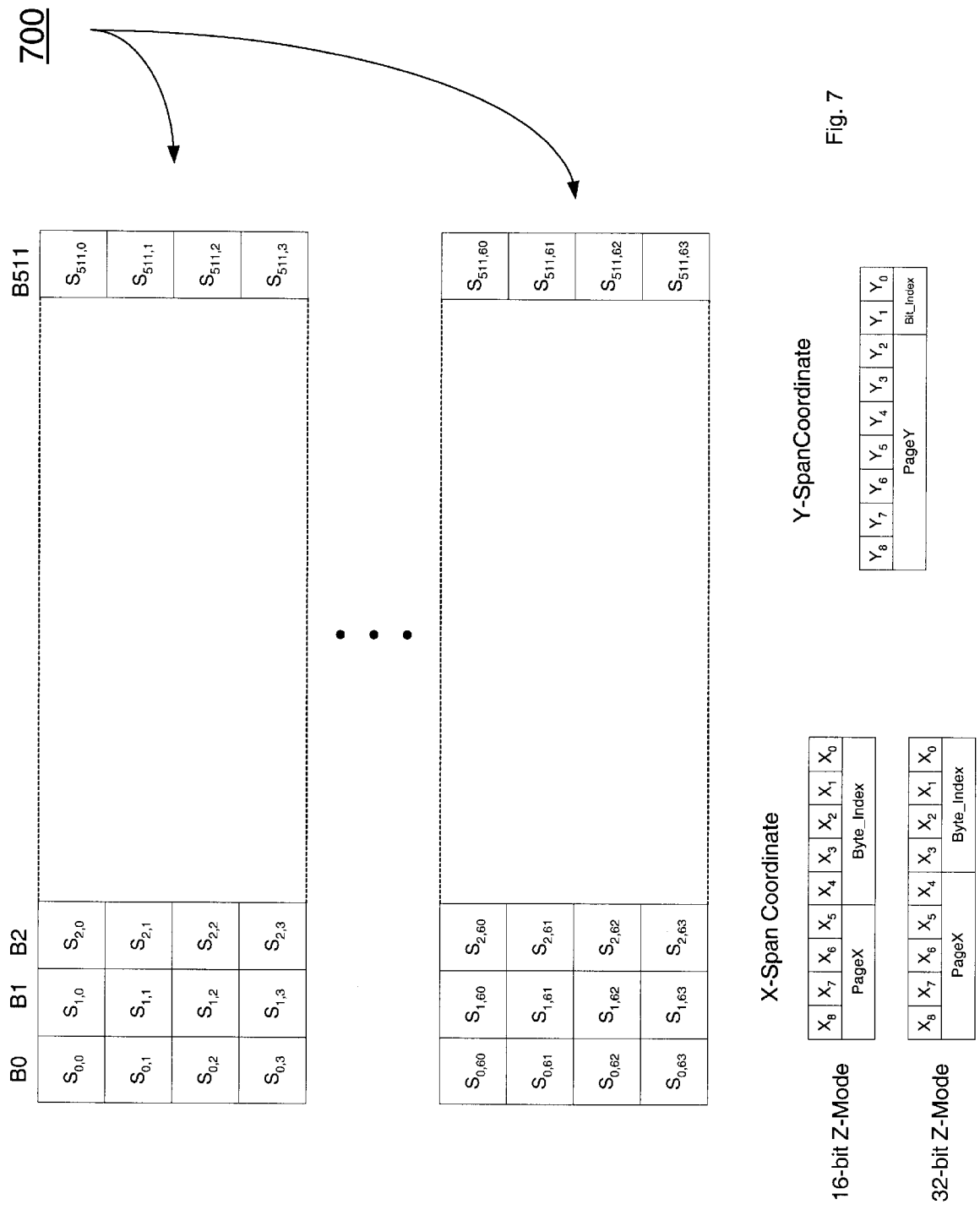
FIG. 7 is one embodiment of a memory map that is suitable for storing status values for data blocks in a linear memory region.

FIG. 7 is a block diagram representing one embodiment of a memory map 700 to store status data in a linear portion of memory 330. For map 700, each status entry, $S_{x,y}$, is associated with a data block that represents z-data for a 4×4 array of pixels (span). Here, $S_{x,y}$ represents the status data for the data block at a span address (x, y). One possible representation of the span address for 16 and 32-bit Z-modes is indicated at the bottom of FIG. 7.

For this data block definition, a 2048×1024 pixel frame buffer may be represented by 512×256 grid of spans. Memory map 700 organizes the spans into groups of 512 bytes each, and each byte stores status bits for a column of 4 spans. When an access targeting a data block at span coordinates (x, y) misses in local cache 430, its status bits, $S_{x,y}$, may be accessed at bits Y[1:0] of byte[Byte_Index] at the memory address:

Status_Bits_Base_Address+PageY·512+PageX·Entry_Size, where

| Entry_Size | = 16-bit Z-mode? | 32:16 |
| PageX | = 16-bit Z-mode? | X[8:5]:X[8:4] |
| PageY | = Y[8:2] | |

-continued

| Entry_Size | = 16-bit Z-mode? | 32:16 |
| Byte_Index | = 16-bit Z-mode? | X[4:0]:X[3:0] |

One factor that complicates z-compression is that compression may not be desirable or feasible for certain spans. ZST 360 provides a convenient tracking mechanism for determining whether a span to be read is stored in a compressed state and whether a span to be written may be compressed before it is written. As noted above, various criteria may be applied to determine whether to compress a particular span for storage in the memory system. These criteria include, for example, whether the span falls fully within the primitive, i.e. whether all pixels of a span are written by the particular operation, and, if the span includes a stencil value, whether all spans in the primitive have the same stencil value. For example, if a span is in a cleared state, the cleared value is a constant for all pixels in the frame and may be stored in a more readily accessible register. The other criteria may be better appreciated in view of the different uncompressed and compressed formats in which the data blocks may be stored.

FIGS. 8A and 8B are block diagrams representing uncompressed formats 810 and 850 for 16-bit and 32-bit z-data, respectively, when it is stored as spans. For 16-bit format 810, each row corresponds to one quad word (QW) of data (4×16 bits), and for 32-bit format 850, each row corresponds to one double quad word (DQW) of data (4×32 bits). The z-values of the 16 pixels in the span are labeled $Z_{0,0}$–$Z_{3,3}$. For one embodiment of 32-bit format 850, each 32-bit value may include a 24-bit z-value and an 8-bit stencil value. Stencil values are used to indicate a portion of the screen for which drawing updates are not necessary. For example, a pixel that is obscured by a window border may include a stencil value that is to be written instead of the pixel value. For one embodiment of the invention, a span whose pixels are associated with different stencil values may not be compressed.

FIG. 9 represents one embodiment of a compressed data block 900, which may be generated from uncompressed formats 810, 850 or other uncompressed formats. Compressed data block 900 is one DQW, which is 50% of the size of 16-bit format 810 and 25% of the size of 32-bit format 950. The disclosed embodiment of compressed format 900 may be generated through a lossless compression method. One method is based on a functional representation of the z-values for a primitive such as that used by interpolator 460 to determine z-values for primitive locations from vertex values.

For one compression method, z-values for a given primitive are represented as:

$$Z(x, y) = +C_0 + C_x \cdot x + C_y \cdot y, \quad \text{(Eq. I)}$$

where $C_0$ represents a Z value at a reference point, e.g. x=y=0, $C_x$ represents a (linearized) z-dependence in the x direction, and $C_y$ represents a linearized z-dependence in the y-direction. When the pixel z-values for a span are parameterized through Z(x, y) or a similar function, the Z-values may be represented by the coefficients, $C_0$, $C_x$, and $C_y$, rather than by storing the z-values themselves. Compressed data block 900 can store sixteen 24-bit z-values and an 8 bit stencil value (4DQWs) as three 40-bit coefficients and an 8-bit stencil value (1DQW), provided all sixteen pixels have the same stencil value.

Another mechanism for compressing z-values for a span stores a z-value for one pixel of the span and the differences between this z-value and those of the other pixels of the span. Since the differences are expected to be small, they may be represented using fewer bits. For example, for 16-bit z-values, the reference z-value may-be stored as a 16-bit value and differences for the remaining 15 pixels may be stored as 7-bit values. Alternatively, the 8 pixels that are closest to the reference value may be specified by 7-bit difference values, and the remaining 7 bits may be specified by 8-bit values. Other variations on this difference-based compression mechanism are possible. These mechanisms are not guaranteed to be lossless, since the differences may require greater resolution than is provided by the allotted bits. Embodiments of the mechanism may bypass compressing a data block if it appears that the compression will be not be lossless.

Figure 10A:
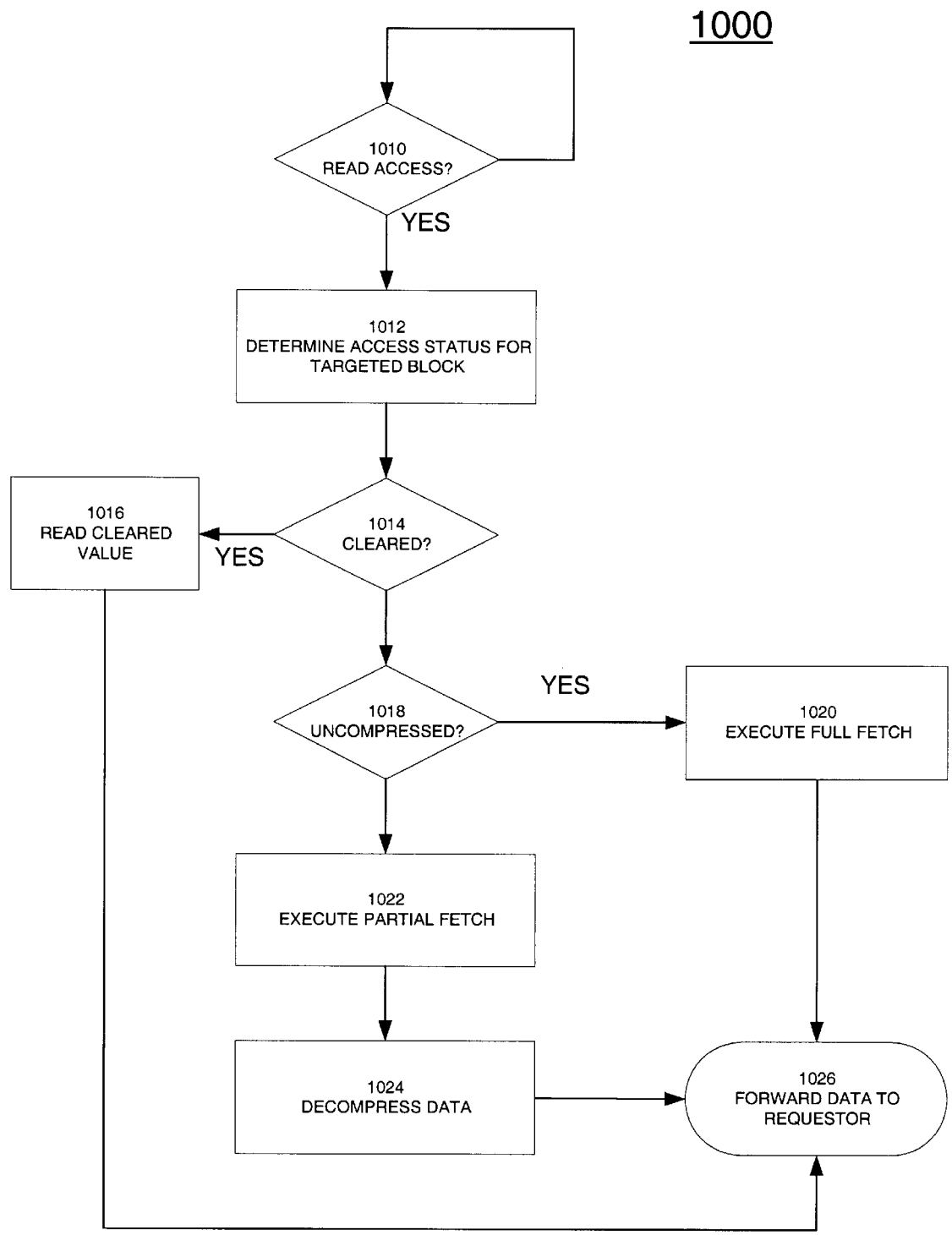
FIGS. 10A–10C are flowcharts representing embodiments of methods for implementing memory reads, memory writes, and status updates for blocks of z-data.

FIG. 10A represents one embodiment of a method 1000 in accordance with the present invention for processing a read access to memory. Method 1000 may be implemented, for example, using the system of FIG. 3 or any other system that provides a mechanism to track the status (compressed, uncompressed, cleared) of the data blocks being read. According to method 1000, a read access is detected 1010 and a status for the block targeted by the read is determined 1012. In system 400, for example, the status is indicated by an entry in local cache 430 or memory 440, depending on whether the read hits or misses, respectively, in local cache 430.

If the status is determined 1014 to be "cleared", the cleared value is read 1016 from a local register and forwarded 1026 to the requestor. No fetch is issued to the memory system. If the status is determined 1018 to be "uncompressed", the data is retrieved by executing 1020 a full fetch, and the retrieved data is forwarded 1026 to the requester. For the disclosed embodiments, a full fetch transfers 4 quad-words (QWs) for each block of 16-bit z-data and 4 double quad-words (DQWs) for each block of 32-bit z-data. For embodiments of local cache 430 that allow QW or DQW granular reads, "full fetch" means a fetch of the targeted data in uncompressed form.

If the status is determined 1018 to be "compressed", the data is retrieved by executing 1022 a partial fetch. For the disclosed embodiments, a partial fetch transfers one DQW for each block of 32 or 16-bit z-data. The retrieved data is decompressed 1024 and forwarded 1026 to the requestor. A copy of the compressed data may be saved temporarily. If the requester does not modify the forwarded data, the saved copy of compressed data remains valid and may be returned to local cache 430 or memory 440. For system 400, the compressed/uncompressed data may be fetched from local cache 430 or memory 440, according to whether the read hit or missed, respectively, in local cache 430.

Figure 10B:
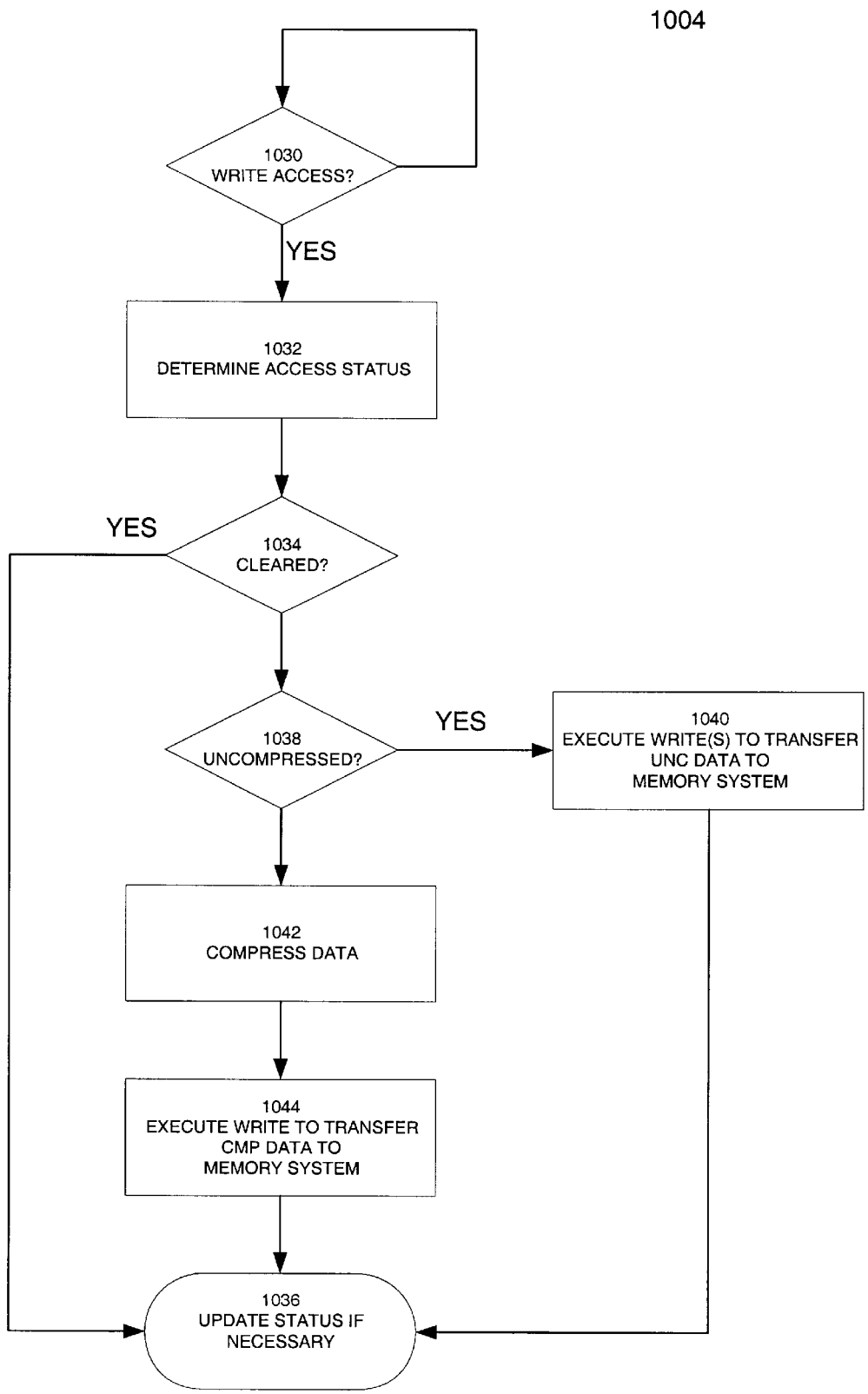

FIG. 10B represents one embodiment of a method 1004 for processing a write access to a memory in accordance with the present invention. Method 1004 may also be implemented by system 400 or a system providing similar support for tracking the status (compressed, uncompressed, cleared) of blocks of z-data. According to method 1004, a write access is detected 1030 and a status is determined 1032 for the data block targeted by the write access, i.e. the data block to be written. Methods for determining the status are discussed in conjunction with FIG. 10C.

If the status is determined 1034 to be "cleared", the block value is already represented by the reference value, and no data write is necessary (done). The status may be updated 1036 in an appropriate field of local cache 430 or an entry of memory 440 to reflect the "cleared" status of the write. If the status is determined 1038 to be uncompressed, a full write is executed 1040 to write the data to the memory system in its uncompressed form, and the status is updated 1036 if necessary. For the disclosed embodiments, a full write transfers 4DQWs for each block of 32-bit data and 4QWs for each block of 16-bit data. For embodiments of local cache 430 that allow QW or DQW granular accesses, "full write" means that the designated QW(s) or DQW(s) are written in uncompressed form.

If the status is determined 1038 to be uncompressed, it is compressed 1042, a partial write is executed 1044 to write the data to the memory system, and the status is updated 1036 if necessary. For the disclosed embodiments, a partial write transfers one DQW for each block of 32-bit or 16-bit data. For system 400, the data block(s) may be written to local cache 430 or memory 440 depending on whether the access hits or misses in local cache 430.

Figure 10C:
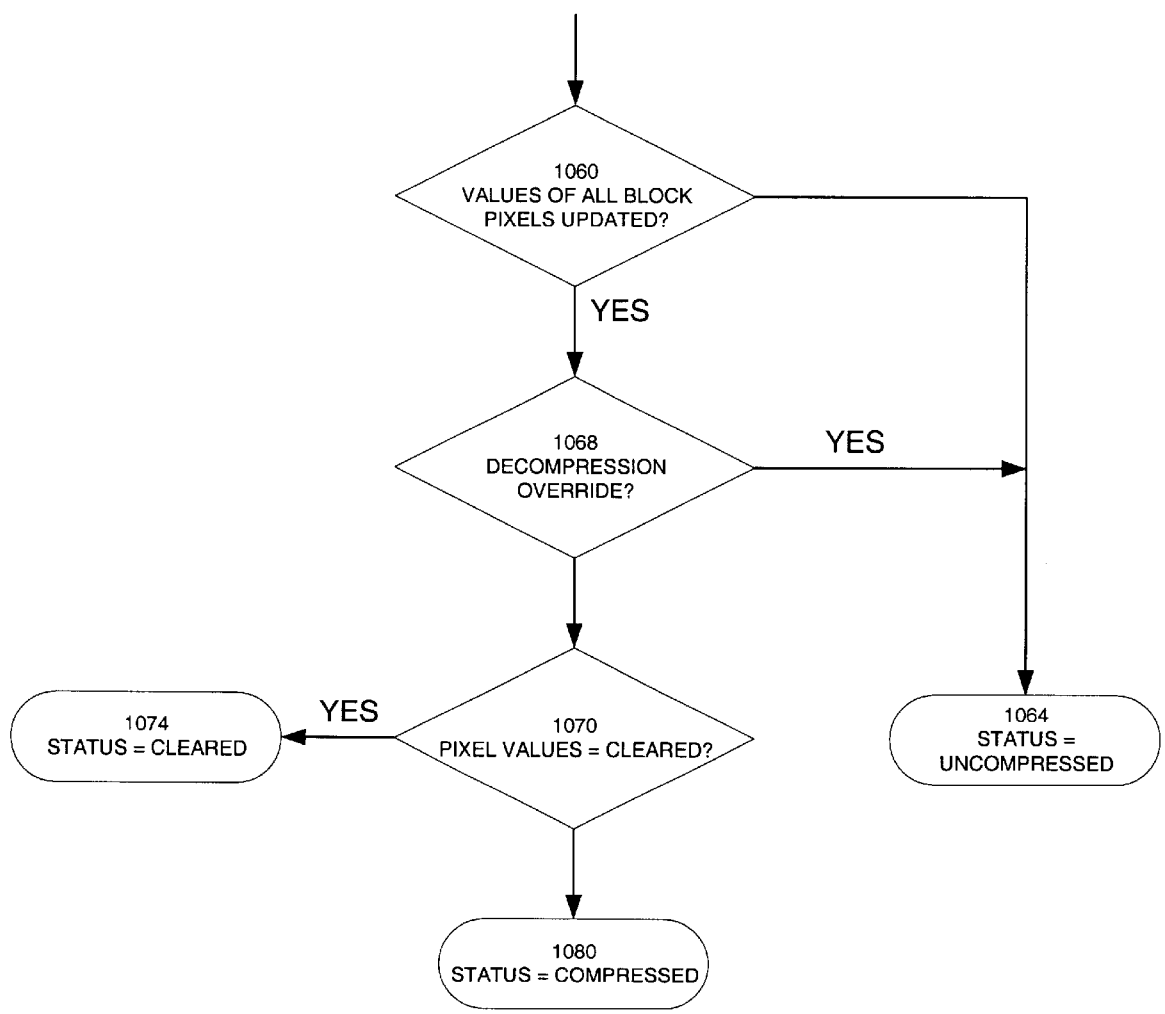

FIG. 10C represents one embodiment of a method 1008 in accordance with the present invention for determining the status for a block of 16-bit data. Status updates for blocks of 32-bit data are discussed in conjunction with Table 3. For method 1008, it is determined 1060 whether z-values for all pixels in a data block are updated. For example, all pixels from a data block 110(*b*) of FIG. 1 fall within a primitive, and are all are updated when the primitive is processed. Pixels in data blocks 110(*a*) are not all updated, since some fall outside the primitive. If all pixel values in a block are not updated 1060, the data block status is set 1064 to uncompressed.

If all pixel values in a block are updated 1060, various override conditions are considered 1068. "Override conditions" are conditions that may preclude accurate compression or decompression of z-values. For example, certain graphics algorithms apply a z-bias to all z-values. Although relatively rare, the z-bias value may be changed if out-of-range z-values are encountered. Since certain z-compression/decompression methods depend on the z-bias value, these will provide incorrect results if a different z-bias value is used for compression and decompression. Consequently, one override condition may be indicated when z-values are clamped to the allowed range by adjusting the z-bias value. Another, potential override condition is attributable to the precision with which z-values are interpolated, which can yield z-values that falls outside the max/min z-values for an image. If these or other override conditions are detected 1068, the status is set 1064 to uncompressed.

If no override condition is indicated 1068, it is determined 1070 whether all pixels of the data block have the cleared value. If all pixels are cleared 1070, the status is set 1074 to clear. If not, the status is set 1080 to compressed.

The disclosed 32-bit z-data format (FIG. 8B), includes both stencil and z-data, and status assignments consider both elements. For example, compressed format 900 uses a single stencil value for all pixels of a data block. Consequently, even if the z-data of a block can be compressed, format 900 does not allow compression if the pixels have different stencil values. Table 2 summarizes the status updates appropriate for the 32-bit format according to the type of data being updated and its previous status.

TABLE 2

| Updates | Data Type/Value | Previous Status | | |
|---|---|---|---|---|
| | | Cleared (CLR) | Compressed (CMP) | Uncompressed (UNC) |
| Stencil Data | Single value for block | Retain CLRD IF value = CLRD value Update to CMP status otherwise | Retain CMP status (update stencil only) | Update stencil only, (retain UNC status) |
| Stencil Data | Multiple values for block | Update to UNC status (update stencil, update z with cleared value) | Update to UNC status (update stencil, update z with cleared value) | Retain UNC status, (update stencil) |
| Z Data | Compressible* | Update to CMP status | Retain CMP status (update compressed z block only) | Update to CMP status (update compressed z-block only) |
| Z Data | Uncompressible | Update to UNC status (update z-values only) | Updated to UNC status (update z-values only) | Retain UNC status (update z-values only) |
| Z & Stencil Data | Compressible# | Update to CMP status (update all values) | Retain CMP status (update all values) | Update to CMP status (update all values) |
| Z & Stencil Data | Uncompressible^ | Update to UNC status (update all values) | Update to UNC status (update all values) | Retain UNC status (update all values) |

*Z-data compressibility may be determined using method of FIG.10C or a comparable method.
Both z-data & stencil data (if present) meet compressibility criteria
^Either z-data or stencil data or both fail to meet compressibility criteria The z-compression/decompression mechanism described above may leave the z-buffer storing data in compressed and decompressed states. This can create problems for programmers in systems that allow certain instructions to read or write the z-buffer directly, i.e. bypassing the read/write unit of system 400. Alternatives for supporting these instructions include requiring programmers to master the details of the depth-compression and write code accordingly or making z-compression transparent to the programmer. The latter alternative hides the details of the mechanism from the programmer and ensures that the data will be properly handled. This transparency may be accomplished, for example, by extending the system state to accommodate state-variables (SVs) for controlling the operation of the graphics system, providing one or more instructions to manage these SVs appropriately, and modifying a graphics driver to intervene when selected instructions are detected. For one embodiment of the invention, a set of graphics instructions are defined to set and update the appropriate bits of the graphics state, and the driver is designed to intervene when instructions that access the Z-buffer are detected.

Table 3 represents selected status bits that may be used to control/configure one embodiment of a graphics system in accordance with the present invention. The various bits are described and bit sizes are indicated.

TABLE 3

| State Variable | Description | Bits |
|---|---|---|
| Compression Enable | If enabled (1), a valid data status array is assumed to exist. | 1 |
| Status Bits Base Address | Specifies the base address of the array in which the status bits are stored (ZST). This may be, for example, the base address of the memory map described in conjunction with FIG. 7. | 12 |
| Clearing | Provides a hook for performing fast clears of all or a portion of the Z-buffer. If a primitive with Z/stencil values identical to those in the "cleared" SVs is sent to the graphics system with this bit set, the HW can eliminate the corresponding accesses to the z/stencil buffers altogether. The status of the data block is updated to "cleared" and subsequent accesses use the "cleared" value stored in the SV. | 1 |
| Force Decompression | Provides a hook for performing fast decompression of the Z-buffer or any part of it. If enabled, the Z/stencil values for pixels covered by the rendering primitives will be read in their current format and written back to memory in uncompressed format. | 1 |
| Cleared Stencil Value | Specifies the reference stencil value. | 8 |
| Cleared Z-Value | Specifies the reference z-value for the z-buffer. This is the value to which all pixels are initialized. It typically represents the z-location (depth) of the back clipping plane for the image space. | 24 |

Figure 11:
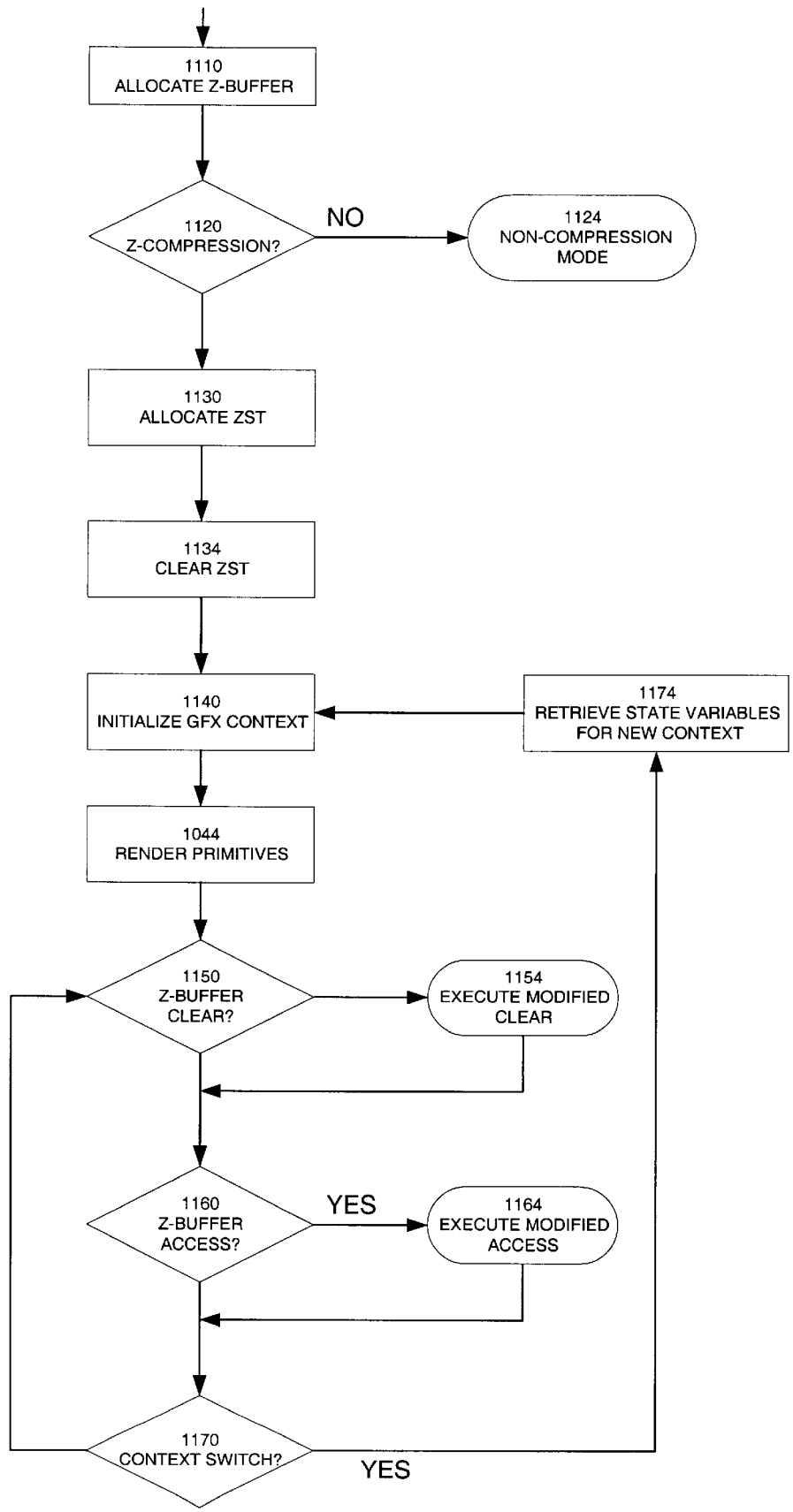
FIG. 11 is a flowchart representing one embodiment of a method for implementing z-compression transparently

FIG. 11 is a flowchart representing one embodiment of a method 1100 for implementing z-compression transparently. Method 1100 may be implemented, for example, by a graphics driver that interprets instructions from a 3D programming environment, such as Win3D, for the underlying graphics hardware.

Initially, a z-buffer is allocated 1110 and it is determined 1120 whether z-compression should be implemented. For example, if tiled memory is not available for the z-buffer or if there is insufficient linear memory to accommodate the z-status table that supports the z-buffer, z-compression may not be implemented. If z-compression is not implemented 1120, a non-compression mode is entered 1124.

If z-compression is to be implemented 1120, memory is allocated 1130 for a z-status table (ZST) and the table entries are cleared 1134. ZST may be cleared, for example, by block transferring (BLITing) zeroes to the entries of ZST. The graphic context is updated 1140 to indicate that z-compression is enabled. For one embodiment of method 1100, state variables such as those indicated in Table 3 are set using an appropriate instruction. Once the graphics context is updated 1140, rendering proceeds 1144 while method 1100 monitors graphics operations for selected events. This monitoring activity is indicated by the loop through blocks 1150, 1160, and 1170.

If a z-buffer clear event is detected 1150, a modified clear operation is executed 1154. If certain z-buffer access events are detected 1160, a modified access operation is executed 1164. Modified clear and access operations are discussed below in greater detail. If a context switch is detected 1170, state variables for the new context are retrieved 1174 and the graphics context is updated 1140. Rendering 1144 and monitoring 1150, 1160, 1170 proceed on the new process. If no context switch is detected 1170, monitoring continues on the current process.

Figure 12:
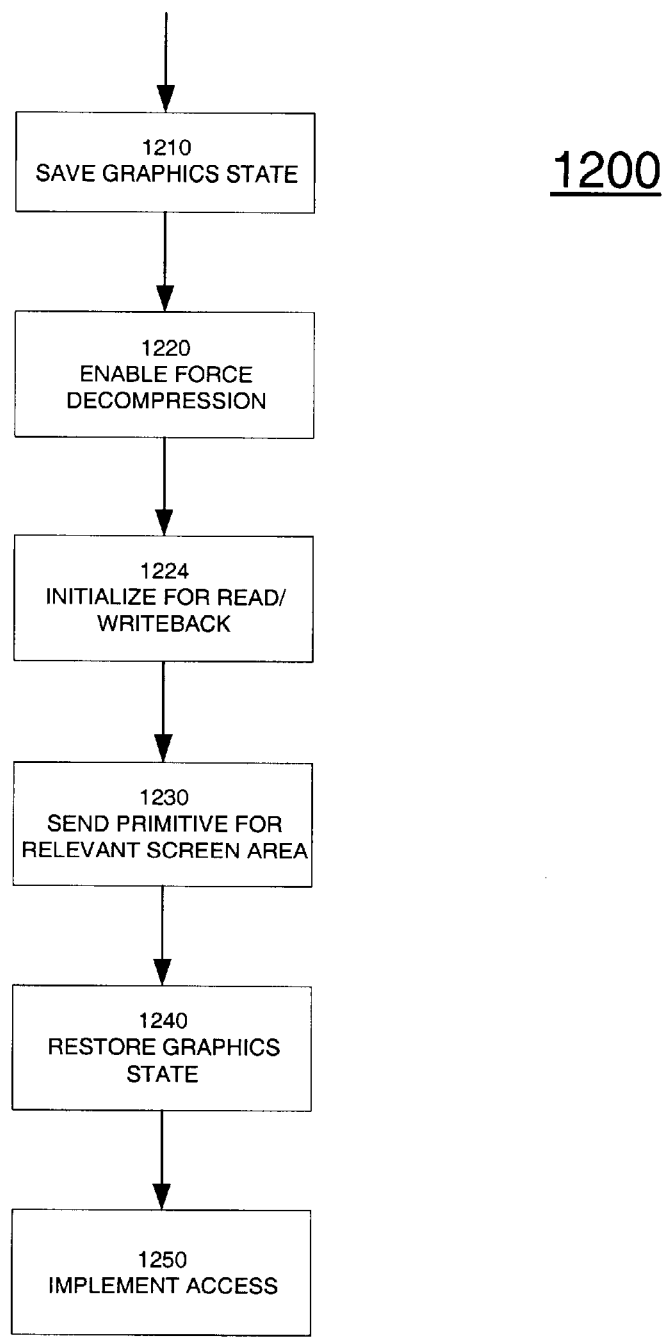
FIG. 12 is a flowchart representing one embodiment of a method for implementing accesses to the z-buffer transparently

FIG. 12 is a flowchart representing an embodiment of a method 1200 for handling selected accesses to the z-buffer transparently (modified accesses 1164). The selected accesses include, for example, attempts by a user application to read the Z-buffer or to lock the Z-buffer when z-compression is enabled. Method 1200 decompresses the z-buffer contents before the selected access proceeds.

For the disclosed embodiment of method 1200, the current graphics state is saved 1210, a bit is set 1220 to enable a fast read/write process for the pixels in a specified primitive ("Force Decompression"), and the graphics state is adjusted 1224 for decompression. For one embodiment, graphics state adjustments-include enabling z-writes and alpha-testing, setting the alpha test function to NEVER, and disabling frame buffer writes. A primitive that encompasses the area to be accessed by the user application is sent 1230 to the graphics engine. When the Force Decompression bit is set in this state, each pixel within the specified primitive is read, decompressed (if necessary), and written back to its memory location. The saved graphics state is restored 1240 and the user-access is implemented 1150.

Restoring the graphics state following decompression means that z-compression is once again enabled. Consequently, subsequent, non-user-initiated write accesses to the z-buffer may be compressed, if the target blocks meet the compression criteria.

Figure 13A:
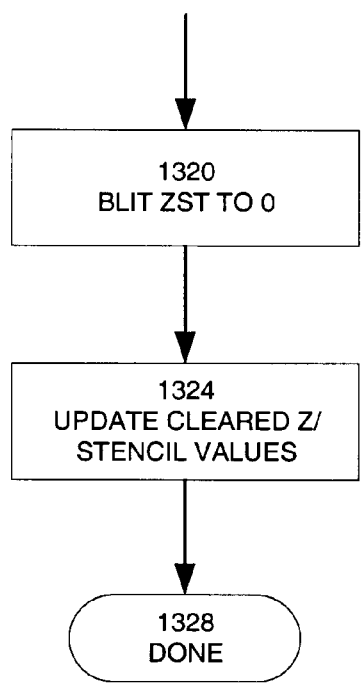
FIGS. 13A–13C are flowcharts representing embodiments of different methods for clearing the z-buffer transparently.

FIG. 13A is a flowchart representing one embodiment of a method 1300 for implementing clear operations transparently, when z-compression is enabled. Method 1300 is implemented through a BLIT operation when the full Z-buffer is cleared (Partial clears are discussed below). For the disclosed embodiment, ZST is cleared by blitting zeroes to its entries 1320 and updating 1324 the cleared stencil and z-values. Significantly, method 1300 does not access the z-buffer to implement this clear when z-compression is enabled. Only the state variables (cleared z and stencil values) for a data block are read when ZST indicates its status is cleared, e.g. state=00.

Figure 13B:
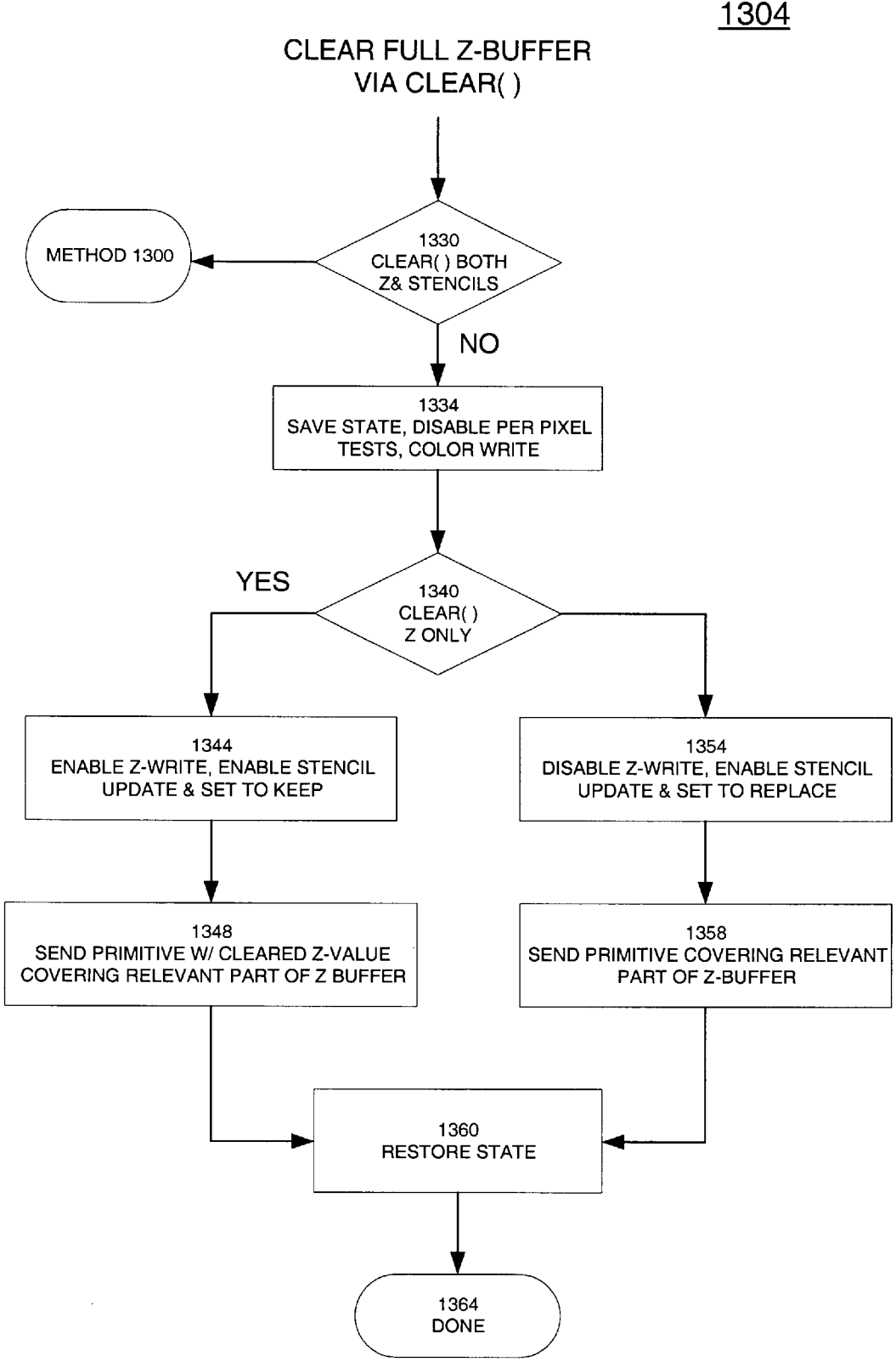

FIG. 13B is a flowchart representing an embodiment of another method 1304 for implementing a Z-buffer clear transparently, when Z-compression is enabled. Method 1304 is implemented through a clear( ) function call when the full z-buffer is cleared. The clear operation depends on whether z-values, the stencil values or both are being cleared. If both stencil and z-values are being cleared 1330 (or if the system is operating in 16-bit mode, which does not support stencils), clearing may be implemented by blitting ZST via method 1300. If only z or only stencil values are being cleared 1330, a primitive is written to the z-buffer to update the values. Since these operations alter the graphics state, the current graphics state (or the portion that will be altered) is saved 1334. In addition, various per pixel tests are disabled.

If only z-values are cleared 1340, z-write is enabled and a stencil update function is disabled 1344. A primitive sized to the z-buffer (or relevant area, for partial clears) and having a vertex z-value equal to the cleared z-value, is rendered 1348. Rendering this primitive clears the entries of the z-buffer without updating the stencil values. The graphics state prior to the clear is restored 1360.

If only stencil values are cleared 1340, z-write is disabled and the stencil update function is enabled 1354. A primitive sized to the z-buffer (or its relevant area, for partial clears) is rendered 1358. The updated stencil value is that specified by the cleared stencil state variable. Z-values are not modified because z-writes are disabled. Following primitive rendering 1358, the graphics state is restored 1360.

Figure 13C:
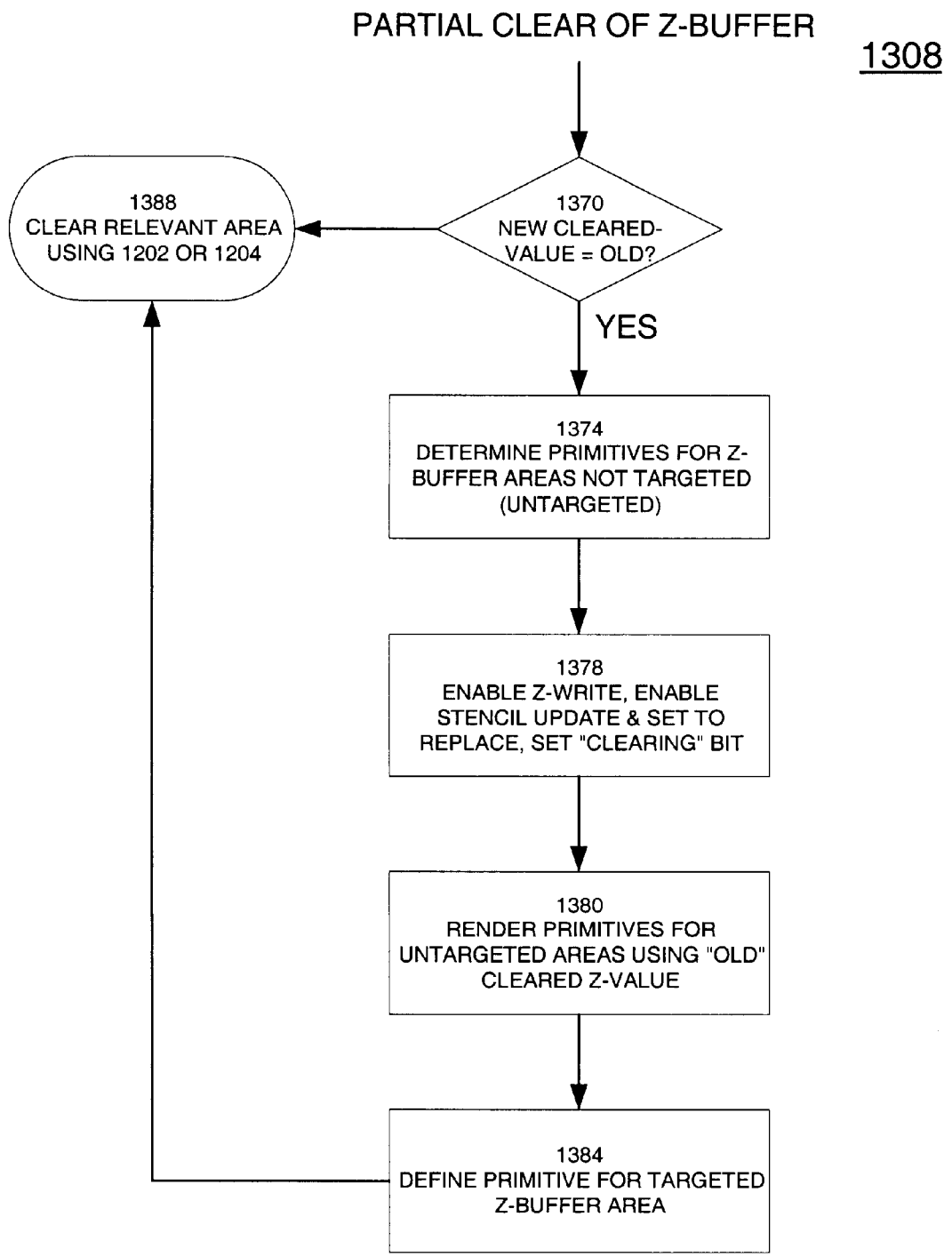

FIG. 13C is a flowchart representing an embodiment of a method 1308 implementing partial, clears of the Z-buffer, when Z-compression is enabled. In the following discussion, the area of the Z-buffer to be cleared is referred to as the "targeted area", and remaining area of the Z-buffer is referred to as the "untargeted area".

For the disclosed embodiment, primitives covering the targeted and untargeted areas are determined 1370. To prepare 1372 for rendering, graphics state information is saved, per pixel tests are disabled, z and-stencil writes are enabled, and the stencil update function is set to "replace". Operations of clear method 1308 depend on whether the new cleared value specified for the targeted area (new cleared value) is the same as the cleared value specified for the untargeted area (old cleared value).

If the new and old cleared values are the same 1374, a "clearing bit" (Table 3) is set and a primitive covering the whole z-buffer is rendered using the cleared value. In this case, a uniform cleared value applies to all entries of the z-buffer, independent of whether they reside in the targeted or untargeted area. Clearing may proceed, for example, by blitting zeroes to the corresponding entries of ZST. The cleared values may be updated but, since they are the same as the old cleared values, the update may be bypassed.

If the new and old cleared values are different 1374, the targeted and untargeted areas are not treated together. For the disclosed embodiment, a primitive covering the targeted area is rendered 1380, using the new cleared value.

There has thus been disclosed a mechanism that reduces the portion of memory bandwidth necessary to service the z-buffer, increasing the bandwidth available to other memory operations. Z-data may be designated as being compressed, uncompressed, or having a reference value. For one embodiment, a data status indicates the designation for each data block, and this designation is checked before an access to a data block is implemented. Access that target compressed data consume less bandwidth, because only a compressed data block is transferred, and accesses that target "cleared" data blocks, may be satisfied by reference to a z-value stored in a local register. Mechanisms are also provided for compressing z-data and for making these compression/decompression operations transparent to user applications, as well as cache structures suitable for supporting these mechanisms.

The disclosed embodiments have been provided to illustrate various features of the present invention. Persons skilled in the art of graphics processing, having the benefit of this disclosure, will recognize variations and modifications of the disclosed embodiments, which none the less fall within the spirit and scope of the appended claims. For example, z-buffering is a particular form of a more general technique referred to as depth buffering. Other forms include W-buffering, which tracks pixels' z-coordinates or functions of these coordinates in a different reference system, e.g. eye space. The present invention may be applied to these and other forms of depth buffering.

We claim:

1. A method for processing data comprising:
   storing blocks of data in entries of a first memory location, each of the blocks of data being stored in one of a cleared, compressed, or uncompressed data states;
   monitoring operations to the first memory location for a selected operation; and
   if the selected operation is detected, implementing a modified version of the selected operation that masks differences between the data states of the data blocks, wherein implementing the modified version of the selected operation includes
   saving a current processor state;

reading one or more data blocks according to their data states in response to the selected operation; and writing the read data back into the entries of the first memory location in an uncompressed state before performing the selected operation on the data in the uncompressed state.

2. The method of claim 1, wherein the selected operation is a read of specified data blocks, and implementing the modified read further comprises:

reading the converted data blocks according to their stored states.

3. The method of claim 1, wherein the selected operation is a clear of entries of the first memory location and implementing the clear comprises setting the states of the data blocks in the first set of entries of the first memory location to the cleared state.

4. The method of claim 3, further comprising updating a cleared state variable in a current processor state.

5. The method of claim 1, wherein the selected operation is a clear of data blocks at specified entries of the first memory location and implementing the clear comprises:

setting the data states of the data blocks to the cleared state if the specified entries include all of the data blocks; and writing a primitive to the specified entries of the first memory location if the specified entries do not include all of the data blocks.

6. The method of claim 5, wherein the specified portion is a depth or a stencil portion of the data blocks.

7. A method for processing z-data comprising:

determining whether z-compression is implemented;

implementing a selected operation if z-compression is not implemented; and implementing a modified form of the selected operation if z-compression is implemented, wherein implementing the modified form of the selected operation comprises saving a current processor state;

reading data blocks from entries of a first memory according to status bits of the data blocks; and writing the read data blocks back into the entries of the first memory in an uncompressed state before executing the selected operation on the data blocks in the uncompressed state.

8. The method of claim 7, wherein determining whether z-compression is implemented comprises:

allocating a first portion of memory to store z-data;

determining whether a memory system can support z-compression; and allocating a second portion of the memory to store status bits for the z-data if the memory system can support depth-compression.

9. The method of claim 8, wherein the z-data is organized as a plurality of data blocks and the status bits indicate an associated data block is compressed, uncompressed, or cleared.

10. The method of claim 9, wherein the selected operation is a read of the entries of the first memory by an application.

11. The method of claim 9, wherein the selected operation is a clear of the first memory, and implementing a modified form of the clear comprises setting the status bits in a second portion of the memory to a value that indicates the associated data is in a cleared state.

12. A machine readable medium on which are stored instructions that are executable by an apparatus to implement a method comprising:

detecting a read or lock by an application on z-data blocks, each block of z-data having a data state indicated by an associated status field;

saving a processor state;

converting the z-data blocks to an uncompressed data state, wherein converting the z-data blocks to an uncompressed data state comprises reading the z-data blocks according to their data states; and writing the read z-data blocks in the uncompressed state before executing the read or lock;

restoring the processor state; and executing the read or lock.

13. The machine readable medium of claim 12, wherein converting the z-data blocks to an uncompressed data state further comprises:

updating status fields of the z-data blocks accordingly.

14. A computer system comprising:

a processor core;

a data-buffer;

a status table associated with the data-buffer, to indicate a status value for each entry of the data-buffer; and a machine-readable medium on which are stored instructions that are executable by the processor core to implement a method comprising:

intercepting a selected instruction that operates on the data-buffer;

saving a current state of the processor core;

modifying the data-buffer and the status table, as necessary, to place data in the data-buffer in a state expected by the selected instruction, wherein modifying the data buffer comprises reading entries of the data buffer according to the status value associated with each of the entries, decompressing the read entries, as necessary, and writing the read entries to the data buffer in uncompressed form before executing the intercepted instruction on the read entries in uncompressed form; and executing the intercepted instruction.

15. The computer system of claim 14, wherein the selected instruction is a clear instruction.

16. The computer system of claim 15, further comprising updating the status values of each of the read entries of the data-buffer in the status table.

17. The computer system of claim 15, wherein reading entries of the data buffer comprises reading a cleared value from a local register for an entry having a cleared status value.

18. The computer system of claim 17, further comprising writing the cleared value to the data buffer and updating the status table.

* * * * *

UNITED STATES PATENT AND TRADEMARK OFFICE
CERTIFICATE OF CORRECTION

PATENT NO. : 6,724,391 B1
DATED : April 20, 2004
INVENTOR(S) : Peled et al.

It is certified that error appears in the above-identified patent and that said Letters Patent is hereby corrected as shown below:

Column 3,
Line 57, delete "can" and insert -- scan --.

Column 4,
Line 9, delete "graphics-data" and insert -- graphics data --.

Column 11,
Line 4, delete "may-be" and insert -- may be --.
Line 46, delete "requester" and insert -- requestor --.

Column 15,
Line 13, delete "adjustments-include" and insert -- adjustments include --.

Column 16,
Line 8, delete "and-stencil" and insert -- and stencil --.

Signed and Sealed this

Twenty-ninth Day of June, 2004

JON W. DUDAS
*Acting Director of the United States Patent and Trademark Office*